(12) United States Patent
Casey et al.

(10) Patent No.: US 8,127,982 B1
(45) Date of Patent: Mar. 6, 2012

(54) PARENTAL CONTROLS

(75) Inventors: Brandon J Casey, San Jose, CA (US); Gary Wipfler, Los Altos, CA (US); Erik Cressall, San Jose, CA (US)

(73) Assignee: Apple Inc., Cupertino, CA (US)

( * ) Notice: Subject to any disclaimer, the term of this patent is extended or adjusted under 35 U.S.C. 154(b) by 358 days.

(21) Appl. No.: 12/351,724

(22) Filed: Jan. 9, 2009

(51) Int. Cl.
G06Q 40/00 (2006.01)

(52) U.S. Cl. ............... 235/379; 235/380; 235/382.5

(58) Field of Classification Search ............ 235/379, 235/380, 382.5
See application file for complete search history.

(56) References Cited

U.S. PATENT DOCUMENTS

| | | | |
|---|---|---|---|
| 5,708,422 A * | 1/1998 | Blonder et al. ............. 340/5.41 |
| 5,914,472 A * | 6/1999 | Foladare et al. ............. 235/380 |
| 5,953,710 A * | 9/1999 | Fleming ............. 705/38 |
| 6,047,270 A * | 4/2000 | Joao et al. ............. 705/44 |
| 6,353,811 B1 * | 3/2002 | Weissman ............. 705/40 |
| 6,609,113 B1 | 8/2003 | O'Leary et al. |
| 6,749,114 B2 | 6/2004 | Madani |
| 6,763,226 B1 * | 7/2004 | McZeal, Jr. ............. 455/90.2 |
| 6,903,681 B2 | 6/2005 | Faris |
| 7,249,092 B2 * | 7/2007 | Dunn et al. ............. 705/38 |
| 7,331,518 B2 | 2/2008 | Rable |
| 7,333,947 B2 | 2/2008 | Wiebe et al. |
| 7,357,310 B2 * | 4/2008 | Calabrese et al. ............. 235/380 |
| 7,389,912 B2 * | 6/2008 | Carlson et al. ............. 235/379 |
| 2001/0051920 A1 * | 12/2001 | Joao et al. ............. 705/41 |
| 2002/0082995 A1 * | 6/2002 | Christie, IV ............. 705/44 |
| 2003/0028481 A1 | 2/2003 | Flitcroft et al. |
| 2003/0135463 A1 | 7/2003 | Brown |
| 2003/0149662 A1 * | 8/2003 | Shore ............. 705/39 |
| 2003/0197058 A1 * | 10/2003 | Benkert et al. ............. 235/380 |
| 2004/0034598 A1 | 2/2004 | Robinson |
| 2004/0039694 A1 * | 2/2004 | Dunn et al. ............. 705/39 |
| 2004/0083394 A1 | 4/2004 | Brebner |
| 2004/0185830 A1 * | 9/2004 | Joao et al. ............. 455/410 |
| 2004/0249753 A1 * | 12/2004 | Blinn et al. ............. 705/41 |
| 2004/0254891 A1 * | 12/2004 | Blinn et al. ............. 705/67 |

(Continued)

FOREIGN PATENT DOCUMENTS

EP 1696626 8/2006

(Continued)

OTHER PUBLICATIONS

Ilium Software, "Users Guide and Reference: Version 6.1," Jul. 2008 (available electronically at: www.iliumsoft.com/dl/doc/eWallet.pdf (accessed Apr. 9, 2009)).

(Continued)

*Primary Examiner* — Daniel Hess
*Assistant Examiner* — Paultep Savusdiphol
(74) *Attorney, Agent, or Firm* — Fletcher Yoder PC

(57) ABSTRACT

Various techniques are provided for establishing financial transaction rules to control one or more subsidiary financial accounts. In one embodiment, a financial account management application stored on a processor-based device may provide an interface for defining financial transaction rules to be applied to a subsidiary account. The financial transaction rules may be based upon transaction amounts, aggregate spending amounts over a period, merchant categories, specific merchants, geographic locations, or the like. The device may update the financial transaction rules associated with a subsidiary account by communicating the rules to an appropriate financial server. Accordingly, transactions made using the subsidiary account by a subsidiary account holder may be evaluated against the defined rules, wherein an appropriate control action is carried out if a financial transaction rule is violated.

23 Claims, 21 Drawing Sheets

U.S. PATENT DOCUMENTS

| | | |
|---|---|---|
| 2004/0260647 A1* | 12/2004 | Blinn et al. .................. 705/41 |
| 2005/0246278 A1 | 11/2005 | Gerber et al. |
| 2006/0006226 A1 | 1/2006 | Fitzgerald et al. |
| 2006/0010042 A1 | 1/2006 | Gianakis et al. |
| 2006/0031160 A1* | 2/2006 | Villa .............................. 705/44 |
| 2006/0031162 A1 | 2/2006 | Brundage et al. |
| 2006/0074698 A1 | 4/2006 | Bishop et al. |
| 2006/0085357 A1 | 4/2006 | Pizarro |
| 2006/0105742 A1 | 5/2006 | Kim et al. |
| 2006/0131390 A1* | 6/2006 | Kim ............................. 235/380 |
| 2007/0011057 A1* | 1/2007 | Archer et al. .................. 705/26 |
| 2007/0040015 A1* | 2/2007 | Carlson et al. ............... 235/379 |
| 2007/0118475 A1 | 5/2007 | Picciallo et al. |
| 2008/0006685 A1 | 1/2008 | Rackley, III et al. |
| 2008/0010190 A1 | 1/2008 | Rackley, III et al. |
| 2008/0010191 A1 | 1/2008 | Rackley, III et al. |
| 2008/0010193 A1 | 1/2008 | Rackley, III et al. |
| 2008/0010204 A1 | 1/2008 | Rackley, III et al. |
| 2008/0016232 A1 | 1/2008 | Yared |
| 2008/0027844 A1 | 1/2008 | Little et al. |
| 2008/0040265 A1 | 2/2008 | Rackley, III et al. |
| 2008/0078831 A1 | 4/2008 | Johnson et al. |
| 2008/0108324 A1 | 5/2008 | Moshir |
| 2008/0126145 A1 | 5/2008 | Rackley |
| 2008/0162346 A1 | 7/2008 | Aaron |
| 2008/0166998 A1 | 7/2008 | Sun et al. |
| 2008/0207203 A1 | 8/2008 | Arthur et al. |
| 2008/0208743 A1 | 8/2008 | Arthur |
| 2009/0098854 A1 | 4/2009 | Park |

FOREIGN PATENT DOCUMENTS

| | | |
|---|---|---|
| JP | 2007323613 | 12/2007 |
| JP | 2007323613 A * | 12/2007 |

OTHER PUBLICATIONS

U.S. Appl. No. 12/351,714, filed Jan. 9, 2009, Casey et al.
U.S. Appl. No. 12/351,649, filed Jan. 9, 2009, Casey et al.
U.S. Appl. No. 12/351,674, filed Jan. 9, 2009, Casey et al.
U.S. Appl. No. 12/351,687, filed Jan. 9, 2009, Casey et al.

* cited by examiner

PARENTAL CONTROLS

BACKGROUND

1. Technical Field

The present invention relates generally to establishing financial transaction rules for controlling a subsidiary financial account and, more particularly, to various systems, methods, and electronic devices configured to provide for the establishment of such rules.

2. Description of the Related Art

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Many payment instruments currently exist and may be used to carry out a financial transaction between two or more parties. For example, payments may be made using cash, credit cards, debit cards, checks, electronic checks, and so forth. In recent years, the growth of electronic commerce may be at least partially attributed to the popularity of credit cards, debit cards, and other non-currency based payment instruments. Thus, while merchants generally continue to accept cash and currency as a method of payment for goods and/or services, most merchants now also accept payments made using credit cards, debit cards, stored-value (e.g., pre-paid) cards, checks, and electronic checks. In particular, online merchants (e.g., those operating "virtual stores" on the Internet or World Wide Web) may rely heavily on the use of credit and debit cards.

As we move to a more mobile and fast-paced society, the use of cash or currency is being increasingly replaced by the convenience afforded by payment cards, such as credit, debit, and stored-value cards. Consequently, children are receiving payments cards from their parents and beginning to use payment cards as payment instruments at younger ages. Generally, credit, debit, and stored-value card accounts used by children (e.g., subsidiary account) are linked to or associated with a primary account held by the parent. That is, while the child may be authorized to initiate charges using a payment card, the parent may ultimately be responsible for paying for such charges. Accordingly, it may be desirable to exert some level of control over the types of purchases or transactions a child is permitted to make using a subsidiary account.

SUMMARY

Certain aspects commensurate in scope with the originally claimed invention are set forth below. It should be understood that these aspects are presented merely to provide the reader with a brief summary of certain forms of the invention might take and that these aspects are not intended to limit the scope of the invention. Indeed, the invention may encompass a variety of aspects that may not be set forth below.

Embodiments of the present invention generally relate to techniques for implementing and defining financial transaction rules for controlling a subsidiary financial account. In accordance with one disclosed embodiment, the financial transaction rules to be applied to a subsidiary financial account may be defined and configured using a processor-based device. In general, the financial transaction rules may be defined by the holder of a primary account to which the subsidiary account is associated. By way of example, the relationship between the primary financial account holder and the subsidiary account holder may be that of a parent-child relationship, employer-employee relationship, or the like. The processor-based device may be additionally configured to transmit the financial transaction rules defined by the primary account holder to a designated financial institution that manages the subsidiary account. For instance, where the subsidiary financial account is a credit card account, the financial institution may include an issuing bank and/or a card association. The financial institution may store a record of user preferences associated with the primary and subsidiary financial accounts, and may update these account holder preferences based on the received financial transaction rules.

The financial transaction rules defined using the electronic device may generally limit or restrict transactions or purchases made using the subsidiary financial account. For instance, the financial transaction rules may restrict or limit transactions based upon various criteria including limits or restrictions based upon a transaction amount limit, an aggregate spending limit over a particular time period (e.g., 1 month), a geographic region (e.g., a home zip code), or some combination thereof. Additionally, the financial transaction rules may provide for restrictions or limitations based on merchant categories and specific merchants.

The financial transaction rules defined in accordance with the present techniques may set forth certain control actions to be performed with regard to a particular subsidiary account transaction when a transaction rule is violated, such as when a defined a transaction amount limit is exceeded. The control actions may include automatically declining the subsidiary transaction, notifying the primary account holder of the transaction, as well as requiring or requesting authorization from the primary account holder before the subsidiary transaction is approved. Where authorization is required, a financial transaction rule may have defined therein an allotted amount of time in which the financial institution may wait for an instruction to authorize or decline a subsidiary transaction. The authorization times may be defined by the primary account holder using the process-based device. In one embodiment, the different authorization times may be defined based upon whether a pending subsidiary transaction is an in-person transaction (e.g., a cardholder-present purchase made at a physical "brick and mortar" store) or an online transaction (e.g., a cardholder-not-present purchase made from an online retailer via a website).

In accordance with a further aspect of the presently disclosed techniques, a primary account holder may define financial transaction rules having multiple tiers or levels of authorization with regard one or more of the transaction criteria discussed above. For example, where a financial transaction rule limits an amount that the subsidiary account holder may spend per transaction (e.g., per purchase), the primary account holder may define multiple transaction limits being associated with different respective control actions. For example, the multiple transaction limits may include a first transaction limit associated with a first control action (e.g., notifying the primary account holder for purchases exceeding the first limit) and a second transaction limit associated with a second control action (e.g., requesting authorization from the primary account holder for purchases exceeding the second limit).

In certain embodiments, the processor-based device may be a portable electronic device which may include an application, such as a computer program stored on one or more machine-readable media, adapted to provide the functions discussed above. In one embodiment, the electronic device may include a display and the application may provide for a graphical user interface viewable on the display. By way of the graphical interface, a user may operate the device to perform one or more of the above-mentioned functions, which will be described in further detail below.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present invention without limitation to the claimed subject matter.

DESCRIPTION OF THE DRAWINGS

These and other features, aspects, and advantages of the present disclosure will become better understood when the following detailed description of certain exemplary embodiments is read with reference to the accompanying drawings in which like characters represent like parts throughout the drawings, wherein.

DETAILED DESCRIPTION OF SPECIFIC EMBODIMENTS

Figure 1:
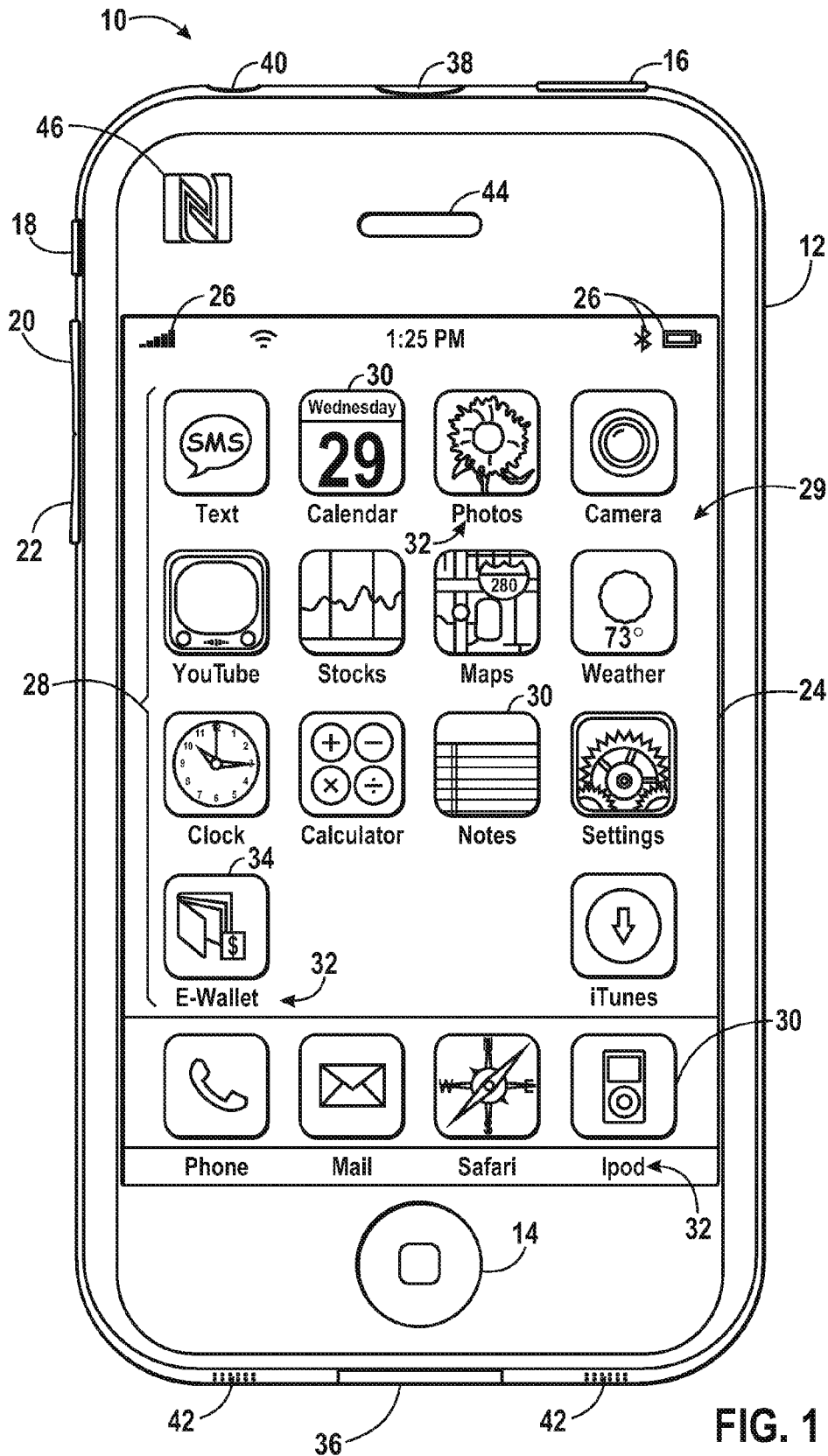
FIG. 1 is a front view of an electronic device in accordance with one embodiment.

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to various techniques for defining financial transaction rules for controlling a subsidiary financial account using a processor-based electronic device. The subsidiary financial account may be associated with or linked to a primary financial account, wherein the primary financial account is ultimately responsible for purchases made using the subsidiary account. The relationship between the primary account holder and the subsidiary account holder may be that of a parent-child relationship, an employer-employee relationship, or any conceivable type of relationship in which control over a subsidiary financial account is desired. Thus, as used herein, the term "parent" and "parent user" and the like shall be understood to mean a primary account holder or entity authorized to define or establish financial transaction rules for a subsidiary financial account. Similarly, the term "child," "child user," "subsidiary," or the like shall be understood to mean individuals or entities authorized to use a subsidiary financial account to make purchases.

The processor-based device may integrate several functionalities for providing a user interface by which a parent user may define various financial transaction rules. The processor-based device may also be configured to communicate the financial transaction rules defined by the parent to a designated financial institution associated with the subsidiary account, such as an issuing bank, using a network or cellular communication protocol, such as a wide area network (WAN), local area network (LAN), or a wireless LAN network. The financial institution may maintain a record or database of the financial transaction rules. For instance, where previously defined rules are presently stored by the financial institution, these rules may be updated based on the newly defined or updated financial transaction rules received from the processor-based device. As will be discussed in further detail below with reference the above-mentioned figures, purchases or transactions initiated using the child account may be evaluated based upon the financial transaction rules, and an appropriate control action (e.g., requiring authorization, declining the transaction) may be carried out. Thus, the various functions provided by an electronic device in accordance with embodiments of the present disclosure, as will be described in further detail below, may generally provide parent users a convenient technique for defining one or more financial transaction rules to control transactions initiated by a subsidiary account holder.

Turning now to the drawings and referring initially to FIG. 1, a handheld processor-based electronic device that may include an application for defining financial transaction rules for one or more subsidiary financial accounts in accordance with the techniques briefly described above is illustrated and generally referred to by reference numeral 10. While the techniques will be described below in reference to the illustrated handheld electronic device 10 (which may be a cellular telephone, a media player for playing music and/or video, a personal data organizer, or any combination thereof), it should be understood that the techniques described herein may be implemented using any type of suitable electronic device, including non-portable electronic devices, such as a desktop computer or a workstation.

As illustrated in FIG. 1, the electronic device 10 may be a handheld device incorporating the functionality of one or more portable devices, such as a media player, a cellular phone, a personal data organizer, and so forth. Thus, depending on the functionalities provided by the electronic device 10, a user may listen to music, play games, record video, take pictures, and place telephone calls, while moving freely with the device 10. In addition, the electronic device 10 may allow a user to connect to and communicate through the Internet or through other networks, such as local or wide area networks. For example, the electronic device 10 may allow a user to communicate using e-mail, text messaging, instant messaging, or other forms of electronic communication. The electronic device 10 also may communicate with other devices using short-range connection protocols, such as Bluetooth and near field communication (NFC). By way of example only, the electronic device 10 may be a model of an iPod® or an iPhone®, available from Apple Inc. of Cupertino, Calif.

In the depicted embodiment, the device 10 includes an enclosure 12 that protects the interior components from physical damage and shields them from electromagnetic interference. The enclosure 12 may be formed from any suitable material such as plastic, metal or a composite material and may allow certain frequencies of electromagnetic radiation to pass through to wireless communication circuitry within the device 10 to facilitate wireless communication.

The enclosure 12 may further provide for access to various user input structures, depicted in FIG. 1 by reference numerals 14, 16, 18, 20, and 22. By way of these user input structures, a user may interface with the device 10, wherein each user input structure 14, 16, 18, 20, and 22 may be configured to control one or more device functions when pressed or actuated. By way of example, the input structure 14 may include a button that when pressed or actuated causes a home screen or menu to be displayed on the device. The input structure 16 may include a button for toggling the device 10 between one or more modes of operation, such as a sleep mode, a wake mode, or a powered on/off mode, for example. The input structure 18 may include a dual-position sliding structure that may mute or silence a ringer in embodiments where the device 10 includes a cell phone application. Further, the input structures 20 and 22 may include buttons for increasing and decreasing the volume output of the device 10. It should be understood that the illustrated input structures 14, 16, 18, 20, and 22 are merely exemplary, and that the electronic device 10 may include any number of user input structures existing in various forms including buttons, switches, control pads, keys, knobs, scroll wheels, and so forth, depending on specific implementation requirements.

The electronic device 10 may further include a display 24 configured to display various images generated by the device 10. By way of example, the display 24 may be configured to display photos, movies, album art, and/or data, such as text documents, spreadsheets, text messages, and e-mail, among other things. The display 24 may also display various system indicators 26 that provide feedback to a user, such as power status, signal strength, call status, external device connections, or the like. The display 24 may be any type of display such as a liquid crystal display (LCD), a light emitting diode (LED) display, an organic light emitting diode (OLED) display, or other suitable display. In certain embodiments, the device 10 may include a touch sensitive element, such as a touch screen interface (not shown in FIG. 1) disposed adjacent to the display 24 that may function as an additional user input structure (e.g., in addition to structures 14, 16, 18, 20, and 22). By way of this touch screen interface, a user may select elements displayed on the display 24 such as, for example, by touching certain elements using the user's finger or a stylus.

As further shown in the present embodiment, the display 24 may be configured to display a graphical user interface ("GUI") 28 that allows a user to interact with the device 10. The GUI 28 may include various graphical layers, windows, screens, templates, elements, or other components that may be displayed on all or a portion of the display 24. For instance, the GUI 28 may display a plurality of graphical elements, depicted here generally as icons 30. By default, such as when the device 10 is first powered on, the GUI 28 may be configured to display the illustrated icons 30 as a "home screen," represented herein by the reference numeral 29. In certain embodiments, the user input structures 14, 16, 18, 20, and 22, may be used to navigate through the GUI 28 and, accordingly, away from the home screen 29. For example, one or more of the user input structures may include a wheel structure that may allow a user to select various icons 30 displayed by the GUI 28. Additionally, the icons 30 may also be selected via the touch screen interface.

The icons 30 may represent various layers, windows, screens, templates, elements, or other graphical components that may be displayed in some or all of the areas of the display 24 upon selection by the user. Furthermore, the selection of an icon 30 may lead to or initiate a hierarchical screen navigation process. For instance, the selection of an icon 30 may cause the display 24 to display another screen that includes one or more additional icons 30 or other GUI elements. Also, as shown in the present embodiment, each graphical element 30 may have one or more textual indicators 32 associated therewith, which may be displayed on or near its respective graphical element 30 to facilitate user interpretation of each graphical element 30. For example, the icon 34 may represent a financial account management application and be associated with the textual indicator "E-Wallet" (short for "Electronic Wallet"). It should be appreciated that the GUI 28 may include various components arranged in hierarchical and/or non-hierarchical structures.

When an icon 30 is selected, the device 10 may be configured to initiate, open, or run an application associated with the selected icon 30 and to display a corresponding screen. For example, when the icon 34 is selected, the device 10 may open the financial account management application, which may provide for the configuration of financial accounts owned, held, or managed by the user of the device 10. It should be understood that for each application provided on the device 10, one or more respective screen or screens may be displayed on the display 24 that may include various user interface elements corresponding to a respective application.

The electronic device 10 may also include various input/output (I/O) ports, such as the illustrated I/O ports 36, 38, and 40. These I/O ports may allow a user to connect the device 10 to or interface the device 10 with one or more external devices. For example, the input/output port 36 may include a proprietary connection port for transmitting and receiving data files, such as media files. The input/output port 38 may include a connection slot for receiving a subscriber identify module (SIM) card, for instance, where the device 10 includes cell phone functionality. The input/output port 40 may be an audio jack that provides for connection of audio headphones or speakers. As will appreciated, the device 10 may include any number of input/output ports configured to connect to a variety of external devices, such as to a power source, a printer, and a computer, or an external storage device, just to name a few. As will appreciated, the I/O ports may include any suitable interface type such as a universal serial bus (USB) port, serial connection port, FireWire port (IEEE-1394), or AC/DC power connection port.

Certain I/O ports may be configured to provide for more than one function. For instance, in one embodiment, the I/O port 36 may be configured to not only transmit and receive data files, as described above, but may be further configured to couple the device to a power charging interface, such as an power adaptor designed to provide power from a electrical wall outlet, or an interface cable configured to draw power from another electrical device, such as a desktop computer. Thus, the I/O port 36 may be configured to function dually as both a data transfer port and an AC/DC power connection port depending, for example, on the external component being coupled to the device 10 through the I/O port 36.

The electronic device 10 may also include various audio input and output elements. For example, the audio input/output elements, depicted generally by reference numeral 42, may include an input receiver, which may be provided as one or more microphones. For instance, where the electronic device 10 includes cell phone functionality, the input receivers may be configured to receive user audio input such as a user's voice. Additionally, the audio input/output elements 42 may include one or more output transmitters. Thus, where the device 10 includes a media player application, the output transmitters of the audio input/output elements 42 may include one or more speakers for transmitting audio signals to a user, such as playing back music files, for example. Further, where the electronic device 10 includes a cell phone application, an additional audio output transmitter 44 may be provided, as shown in FIG. 1. Like the output transmitter of the audio input/output elements 42, the output transmitter 44 may also include one or more speakers configured to transmit audio signals to a user, such as voice data received during a telephone call. Thus, the input receivers and the output transmitters of the audio input/output elements 42 and the output transmitter 44 may operate in conjunction to function as the audio receiving and transmitting elements of a telephone.

In the illustrated embodiment, the electronic device 10 further includes a near field communication (NFC) device 46. The NFC device 46 may be located within the enclosure 12, and a mark or symbol on the exterior of the enclosure 12 may identify its location within the enclosure 12. The NFC device 46 may include an antenna that may generally be positioned along the circumference of the housing 12, and may allow for close range communication at relatively low data rates (e.g., 424 kb/s), and may comply with standards such as ISO 18092 or ISO 21481. In some embodiments, the NFC device 46 may also allow for close range communication at relatively high data rates (e.g., 560 Mbps), and may comply with the TransferJet® protocol. In certain embodiments, the communication using the NFC device 46 may occur within a range of approximately 2 to 4 cm. As will be appreciated by those skilled in the art, close range communication using the NFC device 46 may take place via magnetic field induction, thus allowing the NFC device 46 to communicate with other NFC-enabled devices or to retrieve information from tags having radio frequency identification (RFID) circuitry.

Figure 2:
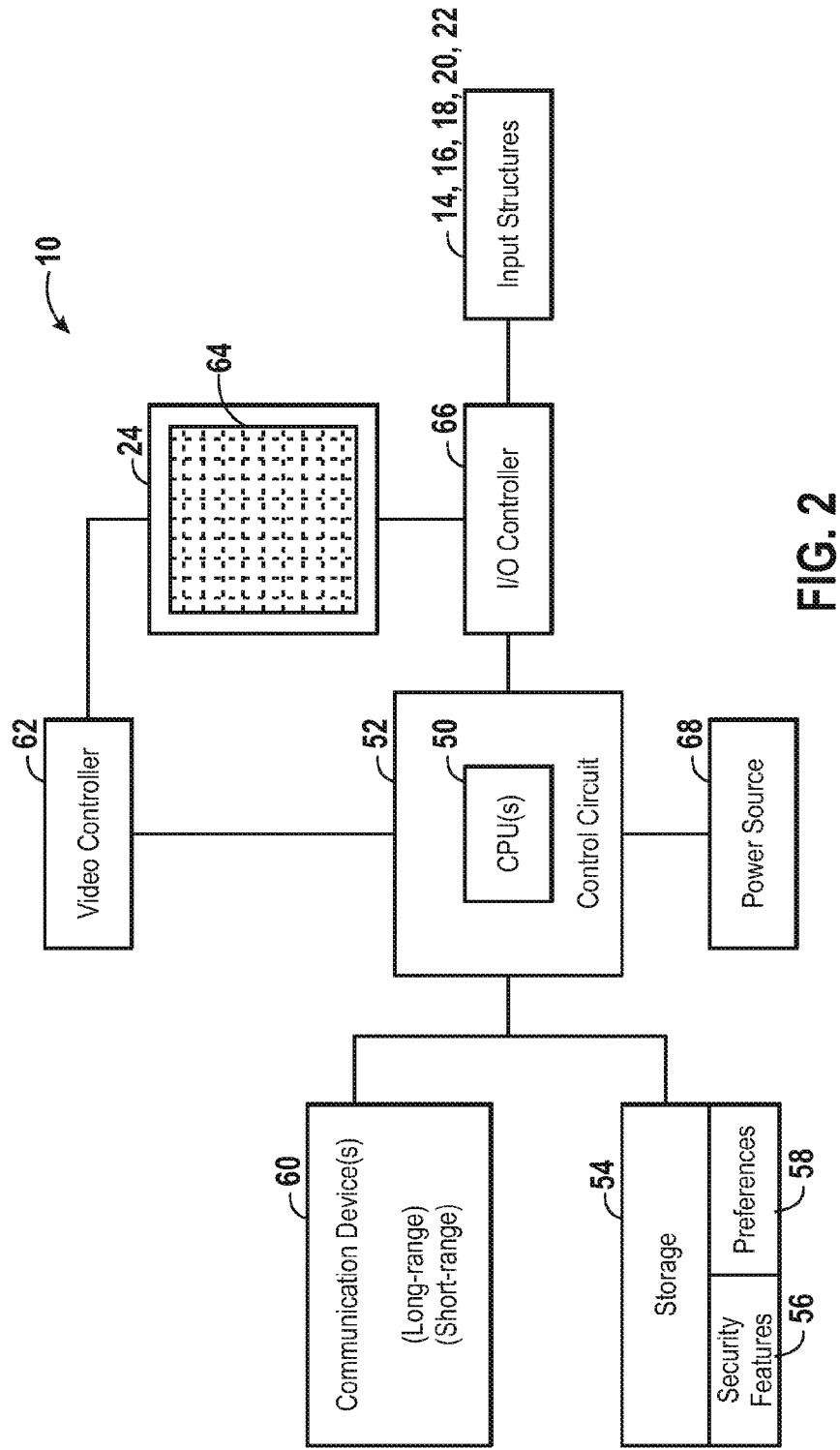
FIG. 2 is a simplified block diagram of the device of FIG. 1 in accordance with one embodiment.

Additional details of the illustrative device 10 may be better understood through reference to FIG. 2, which is a block diagram illustrating various components and features of the device 10 in accordance with one embodiment of the present invention. As shown in FIG. 2, the device 10 may include the above discussed display 24 and NFC device 46, as well as a CPU 50, control circuitry 52, a storage device 54, one or more communication interfaces 60, a video controller 62, a touch screen interface 64, an I/O controller 66, and a power source 68.

The operation of the device 10 may be generally controlled by the central processing unit (CPU) 50 and the control circuit 52. In cooperation, these elements may provide the processing capability required to execute an operating system, application programs, the GUI 28, and any other functions provided on the device 10. The CPU 50 may include a single processor or, in other embodiments, it may include a plurality of processors. By way of example, the CPU 50 may include "general purpose" microprocessors, a combination of general and application-specific microprocessors, instruction set processors, graphics processors, video processors, as well as related chips sets and/or special purpose microprocessors. The control circuit 52 may include one or more data buses for transferring data and instructions between components of the device 10. The control circuit 52 also may further include on board memory (RAM) for caching purposes. Additionally, although not illustrated in FIG. 2, the device 10 may include a standalone random access memory (RAM) in communication with the CPU 50 by way of one or more memory controllers, which may be integrated within the control circuit 52.

Information used by the CPU 50 may be stored within a long-term storage device, represented by reference numeral 54. The storage device 54 of the electronic device 10 may be utilized for storing data required for the operation of the CPU 50, data to be processed or executed by the CPU 50, as well as other data required by the device 10, such as application and program data. For, example, the storage device 54 may be configured to store the firmware for the electronic device 10 that is used by the CPU 50. The firmware may include an operating system, as well as other programs or drivers that enable various functions of the electronic device 10, GUI functions, and/or processor functions. The storage device 54 may also store components for the GUI 28, such as graphical elements, screens, and templates. Additionally, the storage device 54 may store data files such as media (e.g., music and video files), image data, application software, preference information (e.g., media playback preferences, general user preferences), financial account information, network connection information (e.g., information that may enable the device 10 to establish a wireless connection, such as a telephone or Internet connection), subscription information (e.g., information that maintains a record of podcasts, television shows or other media to which a user subscribes), telephone information (e.g., telephone numbers), and any other suitable data required by the device 10. The long term storage 54 may be non-volatile memory such as read only memory, flash or solid state memory, a hard disk drive, or any other suitable optical, magnetic, or solid-state computer readable media, as well as a combination thereof.

The device 10 may include one or more network communication devices 60 for providing additional connectivity channels for receiving and transmitting information. For example, the communication device 60 may represent one or more network interface cards (NIC) and/or a network controller as well as various associated communication protocols. The communication device 60 may provide for various long-range communication interfaces, such as a wireless local area network (WLAN) interface (e.g., an IEEE 802.11x wireless network), a local area network (LAN) interface, or a wide area network (WAN) interface. By way of example, a WAN interface may permit a private and/or secure connection to a cellular data network, such as the Enhanced Data rates for GSM Evolution (EDGE) network or the 3G network (e.g., based on the IMT-2000 standard). The network communication device 60 may further provide a short message service (SMS) interface.

The communication device 60 may also provide for short-range communication interfaces, such as via a NFC interface using the NFC device 46 or a personal area network (PAN) interface. The PAN interface may provide capabilities to network with, for example, a Bluetooth® network, an IEEE 802.15.4 (e.g., ZigBee) network, or an ultra wideband network (UWB). The network device 60 may include any number and combination of network interfaces. As will be appreciated, the network device may employ one or more protocols, such as the High-Speed Downlink Packet Access (HSDPA) protocol, for rapidly downloading data over a network. Additionally, the network communication device 60 may allow the device 10 to receive software upgrades.

In certain embodiments, the electronic device 10 may include a service discovery networking protocol to establish a connection with an external device through a network interface. For example, both the device 10 and the external device may broadcast identification information using internet protocol standards (IP). In some embodiments, the external device may additionally broadcast information relating to the available services the external device is capable of providing (e.g., printing services for a networked printer). The devices may then use the identification information to establish a network connection, such as a PAN connection or a WLAN connection, between the devices. By way of example, a device identification protocol may be provided by Bonjour®, developed by Apple Inc.

User preference settings 58, which may be stored in the storage device 54, may further determine properties of the above-mentioned communication interfaces provided by the network communication device 60. For instance, the preferences 58 may include a list of networks that the device 10 may connect to and may further govern the order or priority between the communication interfaces. Further, the communication preferences associated with the preferences 58 may be further dependent upon security features 56 available for each respective communication interface. The security features 56 may be stored in the storage device 54 and may include one or more cryptographic protocols, such as a secure sockets layer (SSL) protocol or a transport layer security (TLS) protocol, for establishing secure communications between the device 10 and an external device. The security features 56 may also include one or more encryption applications for encrypting information sent from the device 10. These features may be particularly useful when transmitting information of a sensitive nature, such as payment and/or crediting account information, which may generally include credit card and bank account information, for example. The user preferences 58 may also include various financial transaction rules that may be defined by the user of the device to control subsidiary financial accounts that may be associated with an account belonging to the user of the device, but used by a third party (e.g., a child, employee, etc.).

The security features 56 may also include a secure access-restricted storage area (e.g., within the storage device 54) to limit access to the sensitive data, such as encryption keys, passcodes and passwords, digital certificates, or the like. Additionally, the secure storage area may be adapted to store information pertaining to a user's financial accounts, including credit card accounts, banking accounts, prepaid spending accounts, or the like, including subsidiary accounts that may be associated with an account held by the user of the device. Additionally, in some embodiments, the secure storage area 56, in addition to storing the above-mentioned sensitive data, may be further protected by its own respective password or authorization "personal identification number" (PIN), for example, in order to prevent unauthorized access to the information stored therein.

The device 10 may also include the video controller 62, which may be operatively coupled to the display 24 and configured to receive image data and to send voltage signals corresponding to the pixel values of the image data to the display 24. The displayed image data may be representative of information received through the communication interface 56, as well as information contained in the storage device 54. As will be understood by those skilled in the art, pixel values may be numerical assignments corresponding to respective pixel intensities. Thus, the display 24 may receive the voltage signals from the video controller 62 as an input and produce an image corresponding to the voltage signals. For instance, an image produced by the signals provided by the video controller 62 may represent a screen of the GUI 28 described above with reference to FIG. 1.

As discussed above, a user operating the device 10 may select various graphical elements which may represent applications or information that may be displayed through the GUI 28. A touch screen interface 64 may be positioned in front of or behind the display 24 and may provide a user the ability to select graphical elements, such as the icons 30 displayed by the GUI 28 described above in FIG. 1. The touch screen interface 64 may be configured to receive inputs based on a physical contact (e.g., touching the display 24) either by the user or an object (e.g., stylus) being controlled or manipulated by the user, and to send "touch event" information to the CPU 50. The CPU 50 may then process the detected touch event information and perform a corresponding action. For instance, referring briefly back to FIG. 1, the "touching" of the icon 34 may be processed by the CPU 50 as an instruction to execute or initiate the corresponding electronic wallet application. The touch screen interface 64 may employ any suitable type of touch screen technology such as resistive, capacitive, infrared, surface acoustic wave, electromagnetic, or near field imaging. The touch screen interface 64 may also employ single point or multipoint sensing.

The I/O controller 66 depicted in FIG. 2 may provide an infrastructure for allowing a user to communicate with the CPU 50 through various input structures provided on the device 10, such as the input structures represented by the reference numerals 14, 16, 18, 20, and 22 in FIG. 1. The user input structures 14, 16, 18, 20, and 22 may be used in conjunction with, or independently of, the touch screen interface 64 to provide input information to the device 10.

The power source 68 of the device 10 may include the capability to power the device 10 in both non-portable and portable settings. For example, in a portable setting, in order to facilitate transport and ease of motion, the device 10 may include an integrated power source 68 for powering the device 10. The power source 68 may include one or more batteries, such as a Li-Ion battery, which may be user-removable or secured to the enclosure 12. In certain embodiments, the proprietary connection I/O port 36 may be used to connect the device 10 to a power source for recharging the battery. In other embodiments, the one or more batteries may be non-integrated and may include one or more rechargeable or replaceable batteries. Further, in a non-portable setting, the power source 68 may include AC power, such as provided by an electrical outlet.

Before continuing, it should be noted that several of the subsequent figures depict, by way of a plurality of screen images, various methods and techniques for configuring the electronic device 10 when using a financial management application 34. In general, the depicted screen images may be generated by the GUI 28 and displayed on the display 24. For instance, these screen images may be generated as the user interacts with the device 10, such as via the input structures 14, 16, 18, 20, and 22, and/or the touch screen interface 64. As discussed above, the GUI 28, depending on the inputs and selections made by a user, may display various screens including icons (e.g., 30) and graphical elements. These elements may represent graphical and virtual elements or "buttons" which may be selected by the user by physically touching their respective location on the display 24 using the touch screen interface 64, for example. Accordingly, it should be understood that the term "button," "virtual button," "graphical button," "graphical elements," or the like, as used in the following description of screen images below, is meant to refer to the graphical representations of buttons, menus, or icons represented by the graphical elements provided on the display 24. Further, the functionalities set forth and described in the subsequent figures may be achieved using a wide variety of graphical elements and visual schemes. Thus, it should also be understood that the present disclosure is not intended to be limited to the precise user interface conventions depicted herein. Rather, embodiments of the present invention may include a wide variety of graphical user interface styles.

Figure 3:
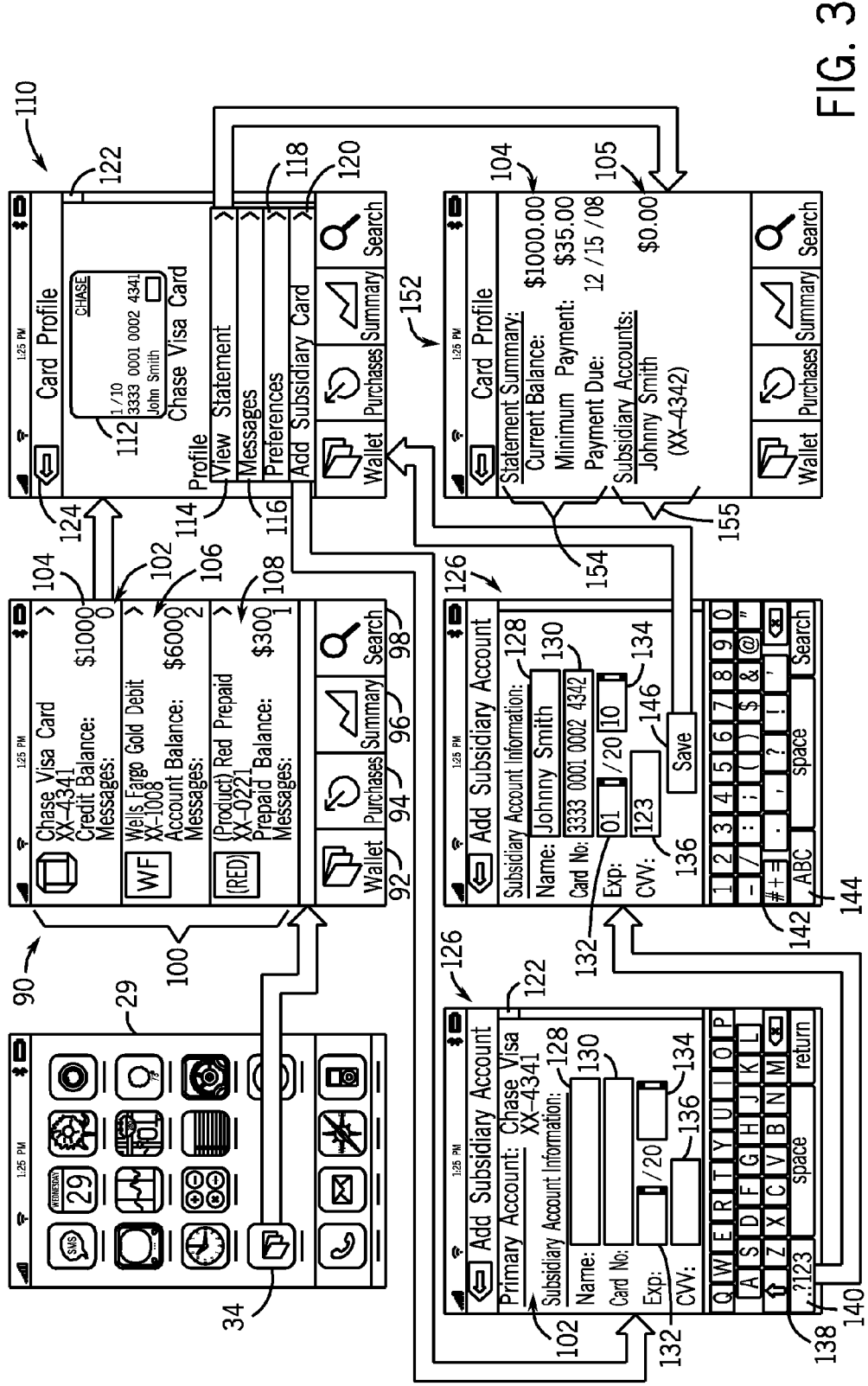
FIG. 3 shows a plurality of screens that may be displayed on the device of FIG. 1 illustrating how information relating to a subsidiary financial account may be stored onto the device of FIG. 1 in accordance with one embodiment.

Referring now to FIG. 3, a plurality of screen images depicting a technique for storing information regarding a subsidiary financial account onto the electronic device 10 is illustrated. Beginning with the home screen 29, a parent user may initiate the financial management application by selecting the graphical icon 34. Upon selecting the graphical icon 34, the screen 90 may be displayed on the device 10. The screen 90 may display a listing 100 of various accounts held by the parent user and stored on the device 10. For example, the financial management application 34 may store a credit card account 102, a debit card account 106, or various other types of accounts, such as a prepaid spending account 108. As shown on the screen 90, each listed account may display a balance, such as a credit card balance 104, associated with a respective account. By way of example, the debit card account 106 may display a corresponding bank account balance, and the prepaid spending account 108 may display the current prepaid balance.

The screen 90 may further display the graphical buttons 92, 94, 96 and 98. Each of these graphical buttons may correspond to specific functions that may be selected by the parent user, as will be discussed in further detail below. For example, upon executing the financial account management application, the function associated with the graphical button 92 may be initially selected by default, whereby the listing 100 of accounts stored on the device 10 is initially displayed. The selection of the graphical button 94 may allow the parent user to view a record of purchases recently made by the accounts stored on the device 10, including subsidiary accounts that may be linked to a primary account held by the parent. The selection of the graphical button 96 may allow the parent user to view a summary of transactions made by one or more of the financial accounts stored on the device 10. By way of example, the summary function may display one or more graphs (e.g., bar graphs, pie-charts) or tables categorizing various purchases over a particular period of time by categories. Further, the graphical button 98 may allow the parent user to search for records corresponding to specific transactions or notification messages.

To view additional details pertaining to a particular financial account, the parent may select one of the accounts (e.g., 102, 106, 108) from list 100 displayed on the screen 90. For instance, as shown in the present figure, upon selecting the credit card account 102, the parent user may be navigated to the screen 110. The screen 110 may display a graphical image 112 of a credit card corresponding to the parent user's credit card account, as well as provide additional selection options by way of the graphical buttons 114, 116, 118, and 120, each of which may be associated with specific functions. In the illustrated embodiment, the graphical button 114 may allow the parent to view a current statement summary for the primary credit card account 102. The graphical button 116 may allow the parent to view messages or notifications relating to the account 102, such as purchase summaries or payment reminders, for instance. The graphical button 118 may allow the parent to configure various user preferences, which may include defining one or more financial transaction rules to be applied to one or more subsidiary financial accounts, as will be described in further detail below. Additionally, the user may select the graphical button 120 in order to initiate the process of storing a subsidiary financial account associated with the primary account 102 on the device 10. Before proceeding with the present discussion, it should be noted that where the display (e.g., 24) on the device 10 is insufficient to display the entirety of the graphical elements 112, 114, 116, 118, and 120, a scroll bar element 122 may be provided which, when selected, may allow the parent user to navigate and view the entirety of the graphical elements displayed by the screen 110. Additionally, the screen 110 may also include the graphical button 124, which when selected, may allow the user to return to a previous screen. By way of example, if the graphical button 124 is selected from the screen 110 of FIG. 3, the parent user may be returned to the previous screen 90.

To store account information representative of a subsidiary account linked to a parent account, such as the credit card account 102, the parent user may select the graphical button 120 mentioned above to navigate to the screen 126. The screen 126 may provide a plurality of text fields 128, 130, and 136, as well as the drop down selection fields 132 and 134. These input fields may be utilized by the parent to enter the account information for a subsidiary account that is linked to or associated with the primary credit card account 102. For example, the parent may enter the name of the subsidiary account holder into the text field 128 by way of the graphical text keyboard interface 138. Further, where numerical inputs are required, such as for entering the subsidiary account number in the text field 130, the parent may select the graphical button 140 to toggle the text keyboard interface 138 to access a numerical keyboard interface 142. The parent user may also return to the text keyboard interface 138 by selecting the graphical button 144. Additionally, where the subsidiary account is a credit card account, the parent may be required to select an appropriate value using the drop down selection fields 132 and 134 to specify an expiration date corresponding to the subsidiary credit card account. The screen 126 may also require that the parent provide a card verification value (CVV) in the text field 136 as an additional security measure. Once the appropriate information for the subsidiary credit card account is entered on the screen 126, the parent may select the graphical button 146 to save the information onto the device 10.

Upon selection of the graphical button 146, the user may be returned to the screen 110. Here, the user may further select the graphical button 114 to access the screen 152, which may display a statement summary 154. The statement summary 154 may display the total current balance 104 associated with the primary account 102, which may include balances 156 owed by the subsidiary account, referred to here by the reference numeral 155. As shown here and assuming that no purchases have yet been made by the subsidiary account holder, the current balance owed by the subsidiary account 155 is $0.00.

Figure 4:
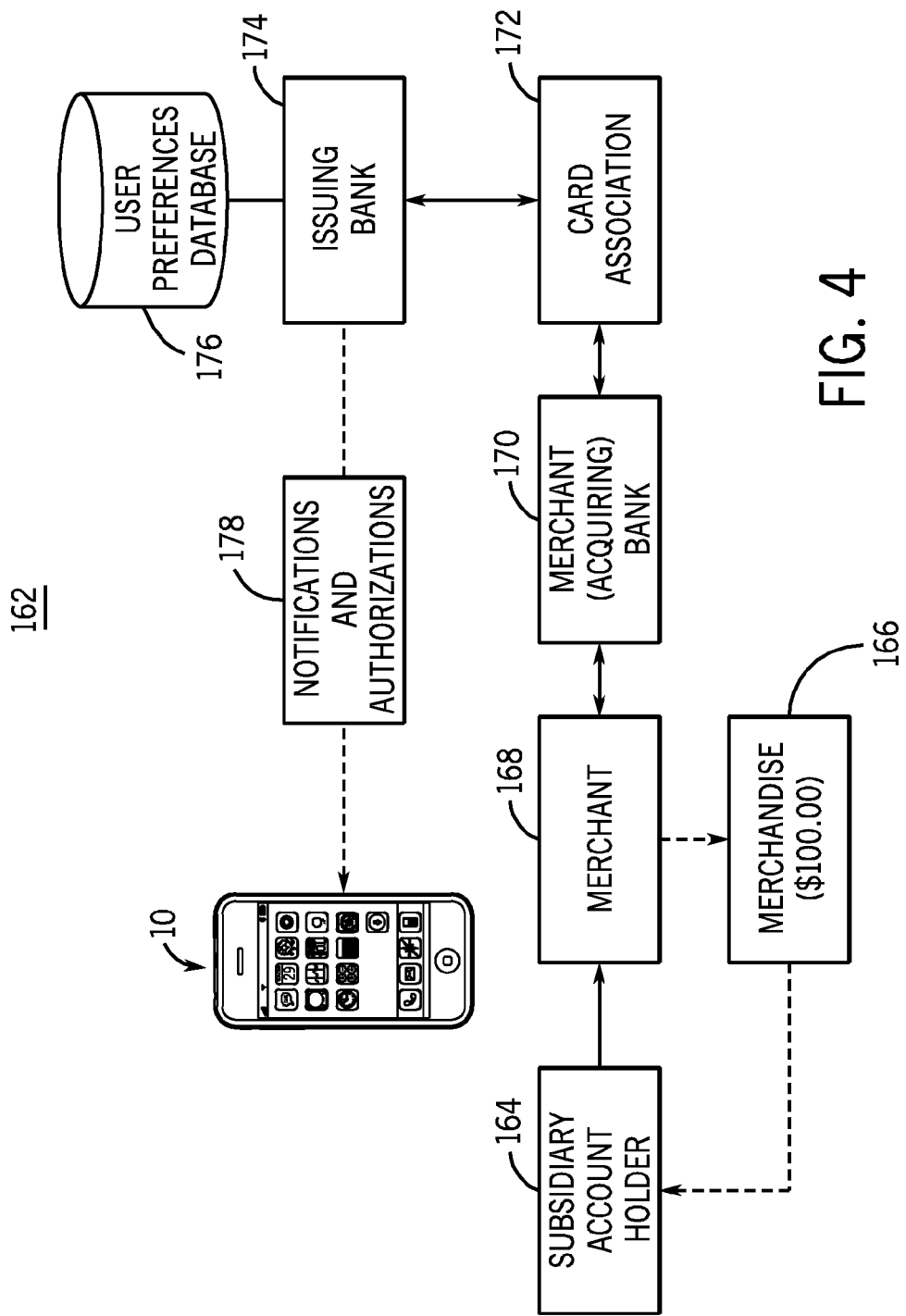
FIG. 4 is a block diagram illustrating a transaction between a holder of the subsidiary account of FIG. 3 and a merchant in accordance with one embodiment.

Continuing now to FIG. 4, a schematic block diagram illustrating a transaction between the child or subsidiary account holder 164 and a merchant 168 is illustrated and generally referred by the reference number 162. By way of example, the transaction 162 may involve the purchase of the merchandise 166 by the subsidiary account holder. The transaction 162 may take place either online, such as through a website operated by the merchant 168, or in person, such as at a physical "brick and mortar" store. Accordingly, it should be appreciated that where the merchant operates online, the subsidiary account holder may either provide the subsidiary account information through a website or by telephone. Additionally, where the transaction 162 takes place in-person at a physical store, the subsidiary account holder may present a physical card to the merchant 168 where the transaction takes place in person. Additionally, in some instances, the subsidiary account holder may posses an electronic device similar to the device 10, which may be configured to store the subsidiary account information. Where the merchant 168 is capable of receiving payment information directly from a device controlled by a subsidiary account holder, the subsidiary account information may be transmitted to a receiving device operated by the merchant 168. For example, the subsidiary account holder's device may include an NFC device which may be configured to transmit the subsidiary account information to a NFC reader or payment terminal operated by the merchant 168.

Once the payment information is received by the merchant 168, the subsidiary account information 155 may be transmitted to the merchant bank 170. The merchant bank 170 may then transmit the subsidiary account information 155 to an appropriate card association server 172. In the present example, the card association server 172 may be a server operated by Visa Inc. If an issuing bank is associated with the subsidiary credit card account 155, the card association 172 may further communicate with the issuing bank 174 to obtain authorization for the transaction 162. Upon receiving an authorization request from the card association 172, the issuing bank 174 may process the transaction request to determine whether or not the transaction 162 between the subsidiary account holder 164 and the merchant 168 may be authorized. For example, as will discussed in further detail below, the subsidiary account 155 may be restricted by one or more financial transaction rules which may be stored in the user's preferences database 176 in communication with the issuing bank 174. The financial transaction rules may be defined by the parent and transmitted to the issuing bank 174 using the electronic device 10. For example, some financial transaction rules may require that the parent provide an authorization to the issuing bank 174 before the transaction 162 may be approved. Thus, the issuing bank 174 may transmit a notification or an authorization request 178 to the electronic device 10, as will be discussed in further detail below. As will be appreciated, the notification or authorization request messages 178 may be transmitted to the device 10 using any suitable network, such as a WLAN, a WAN, or a LAN network, as discussed above. Accordingly, if a required authorization is received from the parent, and if the transaction 162 does not violate any other financial transaction rules defined by the parent, then the transaction 162 may be approved and the subsidiary account holder 164 may acquire the merchandise 166 from the merchant 168.

Before proceeding, it should be noted that in some embodiments, a subsidiary financial account may be provided directly from a card association instead of an issuing bank. For example, certain credit card accounts offered by American Express® and Discover®, may be issued directly from the card association 172 without utilizing an external or exogenous issuing bank 174. In such embodiments, the user preferences database 176 for storing financial transaction rules for the subsidiary account may be directly managed by the card association 172. In further embodiments, the subsidiary financial account 155 may include a loyalty account associated with a particular merchant. As will be appreciated by those skilled in the art, loyalty accounts are generally issued directly from a particular merchant and are typically used to make purchases from that particular merchant. By way of example, a loyalty account may include a Macy's® card offered by the department store Macy's. Thus, financial rules associated with a subsidiary loyalty account may be managed directly by a financial server authorized by the merchant 168. Additionally, the subsidiary financial account may include a debit card account (e.g., subsidiary of primary account 106) or a prepaid account (e.g., subsidiary of primary account 108). For the purposes of the present discussion, it may be assumed that in the transaction 162 illustrated by FIG. 4, no financial control rules have yet been defined by the parent and, thus, the transaction 162 may be approved by the issuing bank 174. However, as will be discussed in detail below, the parent may choose to define one or more financial transaction rules that may limit or control transactions made using the subsidiary financial account 155.

Figure 5:
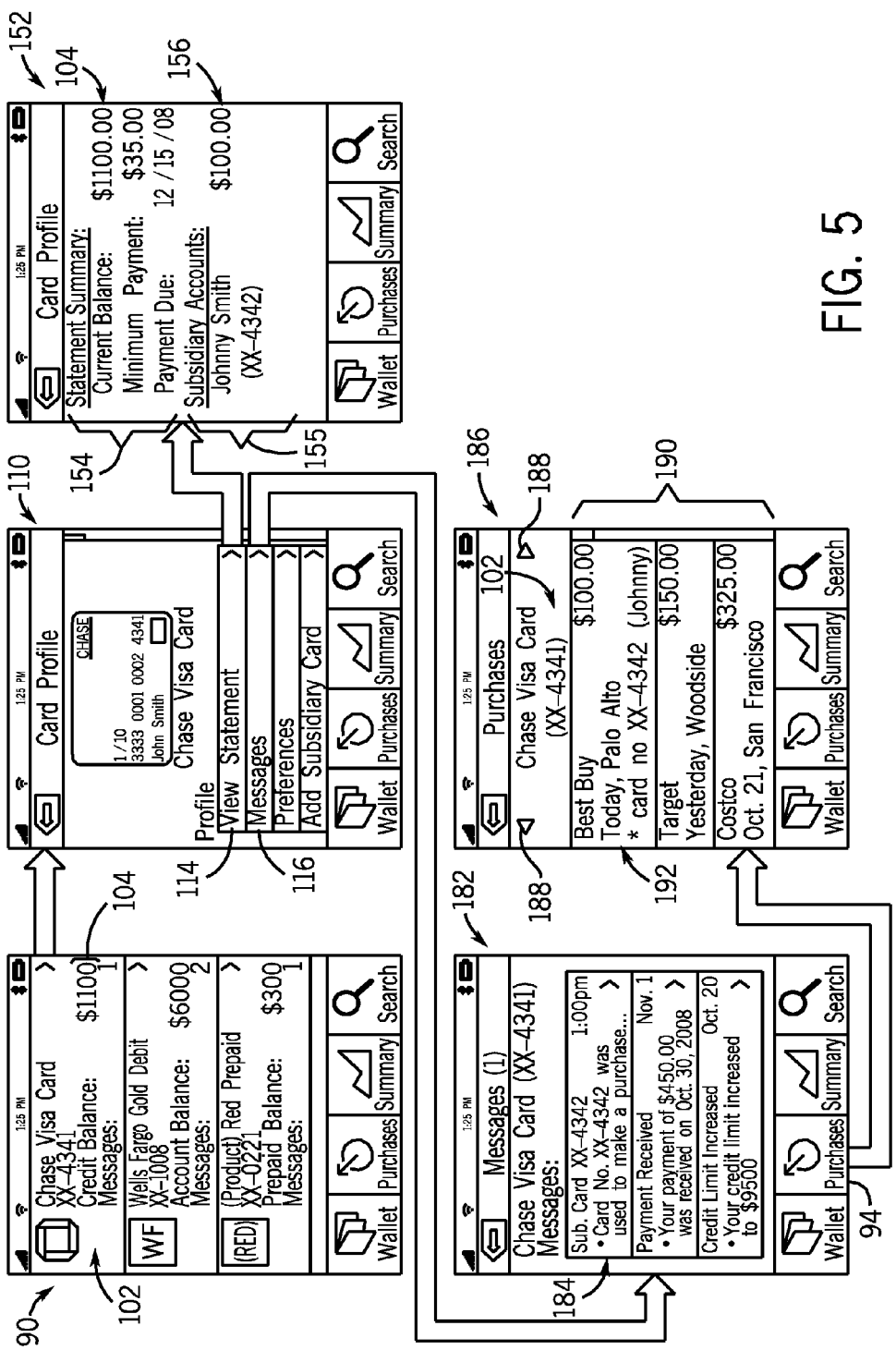
FIG. 5 shows a plurality of screens that may be displayed on the device of FIG. 1 illustrating how a parent may view transactions made by the subsidiary financial account in accordance with one embodiment.

Referring now to FIG. 5, a plurality of screen images depicting how the financial account management 34 may be updated to reflect a purchase made by the subsidiary account holder 164 is illustrated. For example, referring again to the screen 90 in FIG. 5, the balance 104 associated with the primary credit card account 102 may be updated to reflect the purchase of the merchandise 166 by the subsidiary account holder, as discussed above in FIG. 4. The screen 90 may also notify the parent user that an electronic message pertaining to the parent account 102 has been received. By selecting the parent account 102 from the screen 90, the parent user may access the screen 110. From the screen 110, the parent user may select the graphical button 114 to access the screen 152, as discussed above. As shown in the updated screen 152, the statement summary 154 for the parent account 102 is updated to reflect the current balance 104, which may be increased based upon the purchase of the merchandise 166 in FIG. 4 by the subsidiary account holder 164. The screen 152 may also indicate an updated balance 156 for the subsidiary credit card account 155.

Additionally, from the screen 110, the parent user may also select the graphical button 116 to access the screen 182 in order to view the new notification message mentioned above. For example, as shown in the screen 182, the new message 184 may notify the parent that the subsidiary account 155 was recently used to make a purchase (e.g., the transaction 162). Though not shown in the present figure, it should be appreciated that by selecting the message 184, the parent user may view additional specific details regarding the transaction 162, such information regarding the date and time the purchase was made, the merchant from which the purchase was made, as well as the amount charged to the subsidiary account 155 for the purchase.

As discussed above, the graphical button 94 may be associated with a function for displaying an itemized listing of recent transactions charged to the parent account 102 and may include transactions made using the subsidiary account 155. For example, as shown in FIG. 5 upon selecting the graphical button 94 from the screen 182, the parent user may be further navigated to the screen 186. The screen 186 displayed on the device 10 may show a listing 190 of purchases charged to the primary account 102 and may be organized by date with the most recent purchases being displayed first. As shown in the screen 186, the purchase item 192, which may correspond to the transaction 162 of FIG. 4, may be displayed as the most recent charge. Additionally, the screen 186 may also allow the parent to view the purchases made using other accounts stored on the electronic device 10, such as the debit card account 106 and the prepaid account 108. For instance, the parent may access purchase listing of the different accounts by selecting the graphical buttons 188. Thus, the financial account management application 34 may offer real-time updates by which the parent user may monitor activity and receive notifications regarding transactions or purchases made using the subsidiary account 155.

Figure 6:
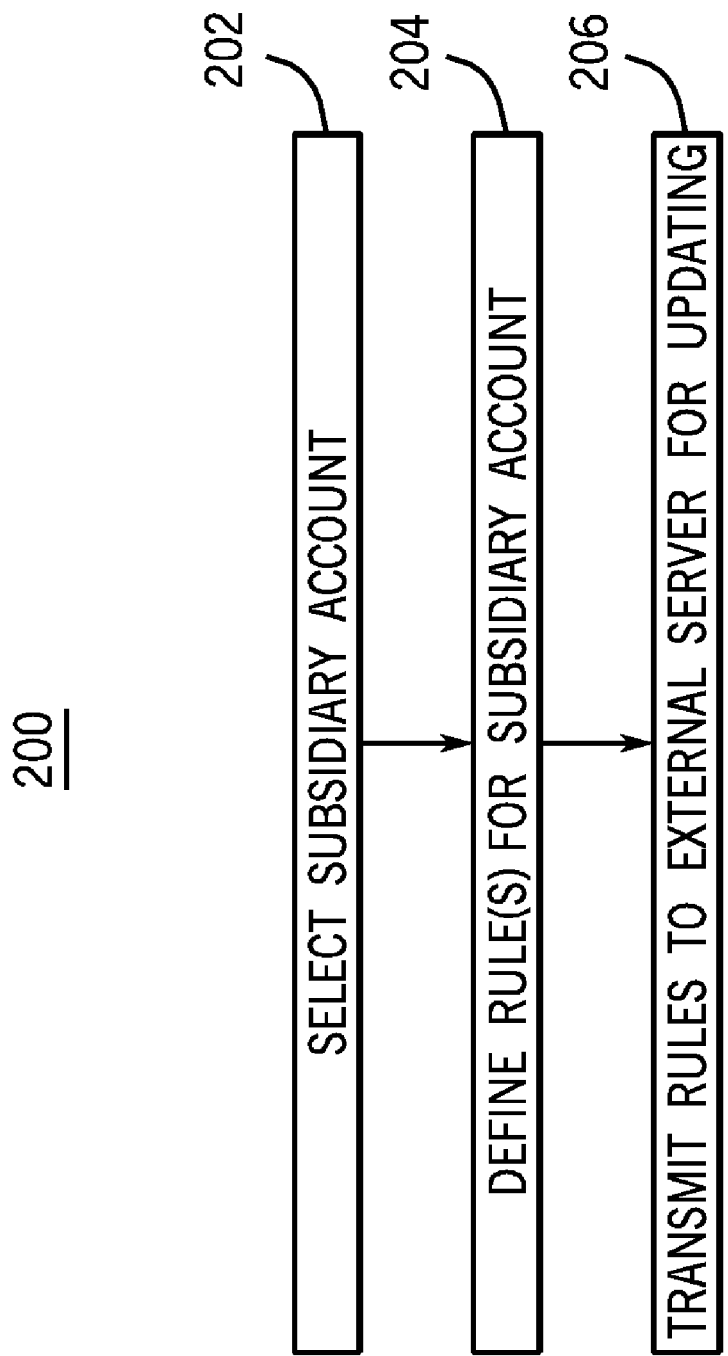
FIG. 6 is a flowchart depicting a method for establishing one or more parental control rules for the subsidiary financial account.

As discussed above, the parent or primary account holder may define one or more financial transaction rules to restrict or control the use of a subsidiary financial account 155. For instance, FIG. 6 shows a method 200 for establishing one or more financial transaction rules to be applied to the subsidiary financial account 155. The method 200, beginning at step 202, may include the selection of a subsidiary account. As discussed above with reference to FIG. 3, the subsidiary account may be entered and stored on the device 10. Next, at step 204, the parent or primary account holder may define one or more financial transaction rules to control or restrict the types of purchases or transactions made using the subsidiary account 155. By way of example, the parent may define rules based on a variety of criteria, such as a per transaction amount, an aggregate transaction amount over a certain period (e.g., a billing month) by merchant categories or by specific merchants, as well as by geographic location. The configuration of financial transaction rules based upon one or more of these criteria will be described in further detail below.

Once the desired financial transaction rules have been defined, the defined rules may be transmitted to an appropriate external server, as shown at step 206. For example, in the case of the subsidiary credit card account 155, the rules may be transmitted to the issuing bank 174 shown in FIG. 4, wherein the issuing bank is configured to store the financial transaction rules in the user preferences database 176. Additionally, as discussed above, depending on the type of subsidiary account the rules may be stored in a database associated directly with a card association, or a loyalty card account server directly associated with a particular merchant.

Figure 7A:
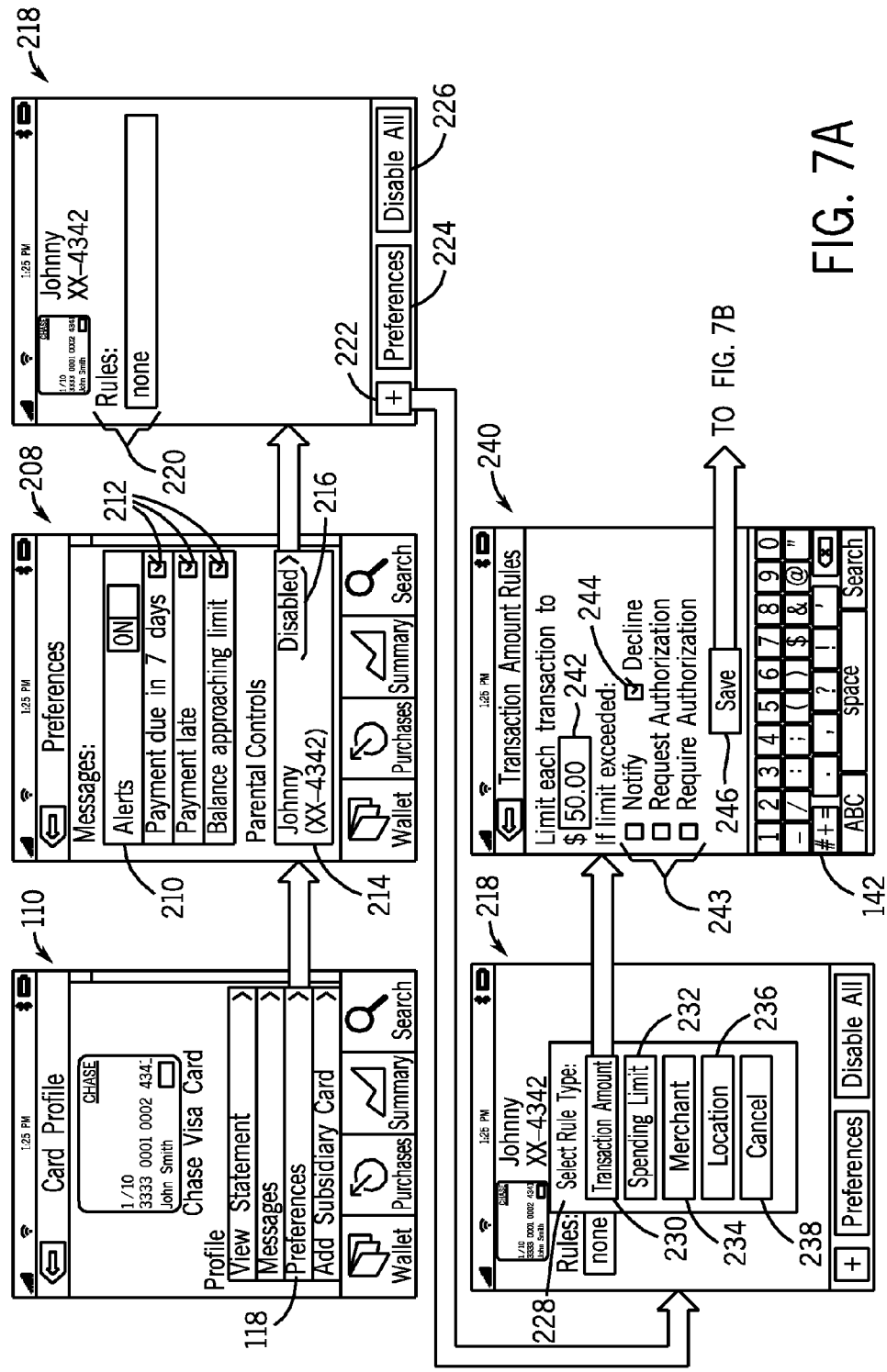
FIGS. 7A and 7B show a plurality of screens that may be displayed on the device of FIG. 1 illustrating the configuration of a financial transaction rule for the subsidiary financial account in accordance with one embodiment.
Figure 7B:
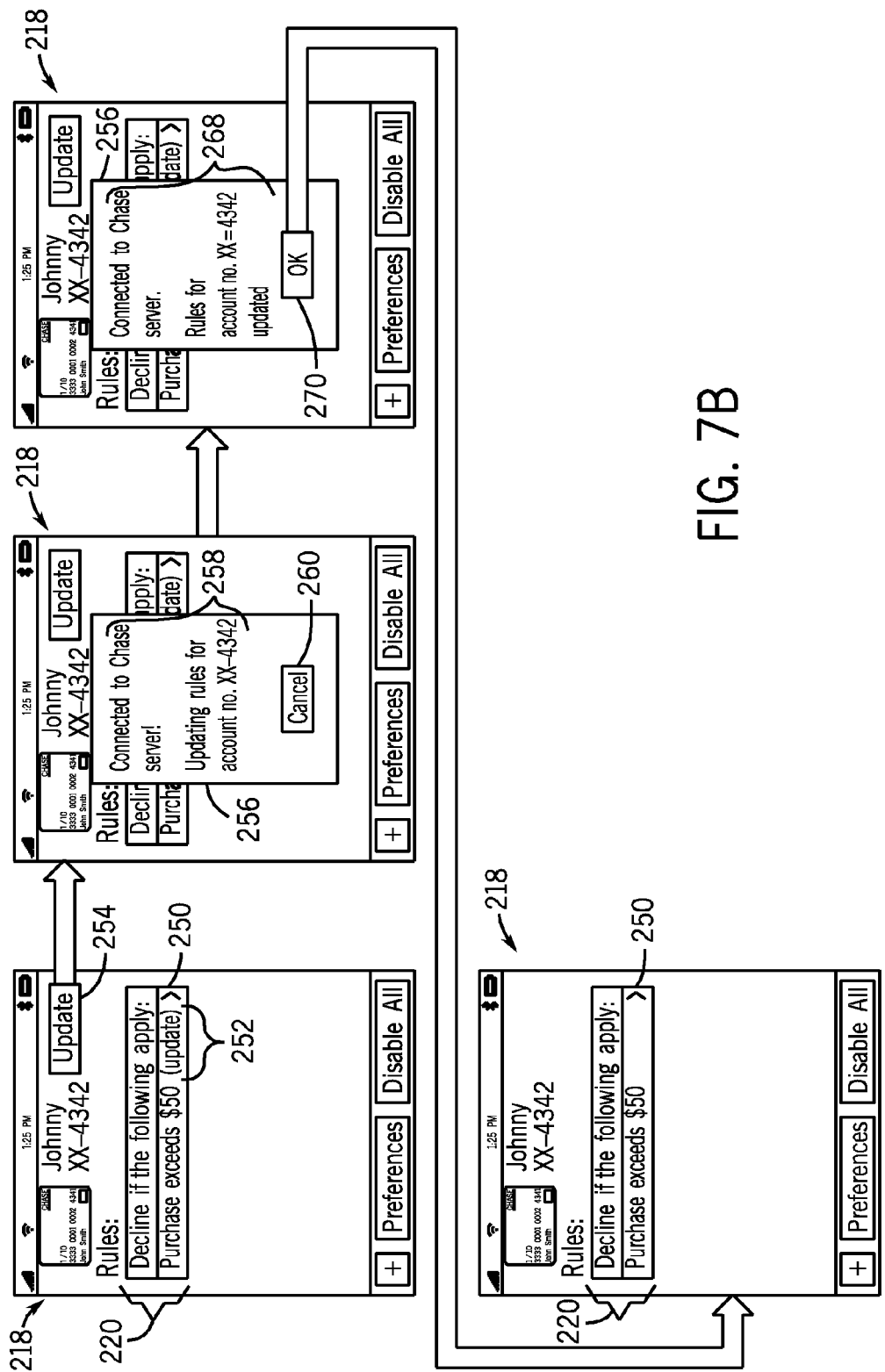

The establishment of financial transaction rules in accordance with the presently disclosed techniques may be better understood with reference to FIGS. 7A and 7B. Particularly, these figures depict a plurality of screen images illustrating how a parent user may control a subsidiary financial account by establishing one or more financial transaction rules using the financial account management application 34 discussed above. For example, beginning with the screen 110, the parent user may select the graphical button 118 to access the screen 208, which may generally provide for the configuration of various user preferences associated with financial accounts managed by the application 34. The screen 208, as shown in FIG. 7A, may provide the parent user with the ability to configure various messaging settings, referred to here by the reference number 210. For instance, the parent user may enable and define various alerts that may be received by the device 10 in the form of electronic messages by selecting one or more of the graphical checkbox elements 212. Additionally, the screen 208 may allow the parent to access and define one or more financial transaction rules for subsidiary accounts stored on the device 10, which may include the subsidiary account 155.

As shown in the present example, the screen 208 may display the graphical button 214 which corresponds to the subsidiary account 155 discussed above. The graphical button 214 may include a status indicator 216, which may indicate to the parent that either no financial transaction rules are currently defined for the subsidiary account 155 or that the financial transaction rules are currently disabled. To initiate the process of configuring a financial transaction rule, the parent may select the graphical button 214 which may cause the screen 218 to be displayed on the device 10. The screen 218 may display a listing of financial transaction rules presently defined and associated with the subsidiary account 155 or, as shown in FIG. 7A, may indicate that no financial transaction rules currently defined for the subsidiary account 155 (e.g., prior to the configuration of such rules). The screen 218 may also display the graphical buttons 222, 224, and 226. The graphical button 222 may be selected by the parent user to add a new rule. The graphical button 224 may allow the parent user to return to the preferences screen 208. Additionally, the graphical button 226 may allow the parent user to disable any currently enabled transaction rules if necessary. For example, if a parent has previously defined a rule which restricts the use of the subsidiary account 155 to a specific geographic region, the parent user may select the graphical button 226 to temporarily disable the financial rules if the subsidiary account holder is currently traveling outside of the specified geographic region, thus allowing for the use of the subsidiary account to make purchases outside of the approved geographic area.

To define a new financial transaction rule, the parent may select the graphical button 222 from the screen 118, which may cause a pop-up window 228 to be displayed on the device 10. The pop-up window 229 may prompt the parent to select a particular type of rule to configure. For example, the pop-up window 228 may display the graphical buttons 230, 232, 234, and 236, each of which may be selected to define a financial transaction rule based on certain criteria. For example, the graphical button 230 may allow the parent user to define a rule that restricts the use of the subsidiary account based on a per-transaction amount. The graphical button 232 may be selected if the parent wishes to establish a rule that restricts the use of the subsidiary account once a particular spending limit has been reached. By way of example, the spending limit may be analogous to a line of credit over a particular period of time, such as a monthly billing cycle. The graphical button 234 may further allow the parent user to define particular rules which may restrict the use of the subsidiary account 155 based on either a specific merchant or based upon certain merchant categories, such as merchants selling a specific type of good or service. Additionally, the pop-up window 228 may also include the graphical button 238, which the parent user may select to return to the listing 220 of rules on the screen 218.

The present example illustrates the configuration of a financial transaction rule based on a per-transaction amount that may be applied to the subsidiary financial account 155. For example, by selecting the graphical button 230 from the pop-up window 228, the screen 240 may be displayed on the device 10. The screen 240 may include a text field 242 by which the parent user may specify a maximum transaction amount by using the numerical keyboard interface 142. As shown in the present example, the parent user may enter a value of $50.00 as a maximum per-transaction limit. Additionally, the parent user may select a "control action" from a variety of control action options 243. The selected control action may determine what action is to be taken if a transaction made using the subsidiary account 155 exceeds the transaction limit (e.g., $50.00) specified in the text field 242. As shown in the screen 240, the available control actions may include an action to send a notification to the parent device 10, an action to automatically decline the transaction, an action to request (e.g., but not require) authorization for a transaction, and an action to require authorization (e.g., the transaction is declined if parental authorization is not received). In the presently illustrated example, the parent may select the graphical checkbox element 244 to specify that transactions exceeding $50.00 made using the subsidiary account 155 are to be automatically declined. Thereafter, once the desired financial transaction rule has been defined on the screen 240, the parent may select the graphical button 246 to save the current financial transaction rule on the device 10.

Upon selecting the graphical button 246, the parent user may be returned to the updated screen 218, as shown in FIG. 7B. In the updated screen 218, the listing 220 of parental control rules may be updated to reflect the per-transaction amount rule defined by the parent in FIG. 7A. For example, the updated listing 200 of financial transaction rules may display a set of conditions 250 upon which transactions made using the subsidiary account 155 are to be declined, and may include the per-transaction limit of $50.00 established in FIG. 7A.

As discussed above with reference to the method 200 in FIG. 6, financial transaction rules defined by a parent user for controlling the subsidiary account 155 may need to be transmitted to an external server, such as a user preferences database (e.g., 176) associated with an issuing bank, card association, or a loyalty account server, such that the user preferences associated with the primary account 102 and subsidiary account 155 may be updated to reflect the newly defined rule. As shown in FIG. 7B, the newly entered transaction rule displayed in on the screen 218 may include a status indicator 252 informing the parent user that an update with an appropriate external server must be performed before the rule will take effect. Accordingly, the updated screen 218 may also display the graphical button 254 which may be selected by the parent user to initiate the update process. For example, upon selecting the graphical button 254, the pop-up window 256 may be displayed on the screen 218. The pop-up window 256 may include the notification message 258 informing the parent user that the device 10 is establishing a connection with an external server, such as a user preferences database 176 at a corresponding issuing bank 174, and that the user preferences associated with the subsidiary account 155 are being updated. The pop-up window 256 may also include the graphical button 260 which may be selected to cancel the updating process.

Figure 8:
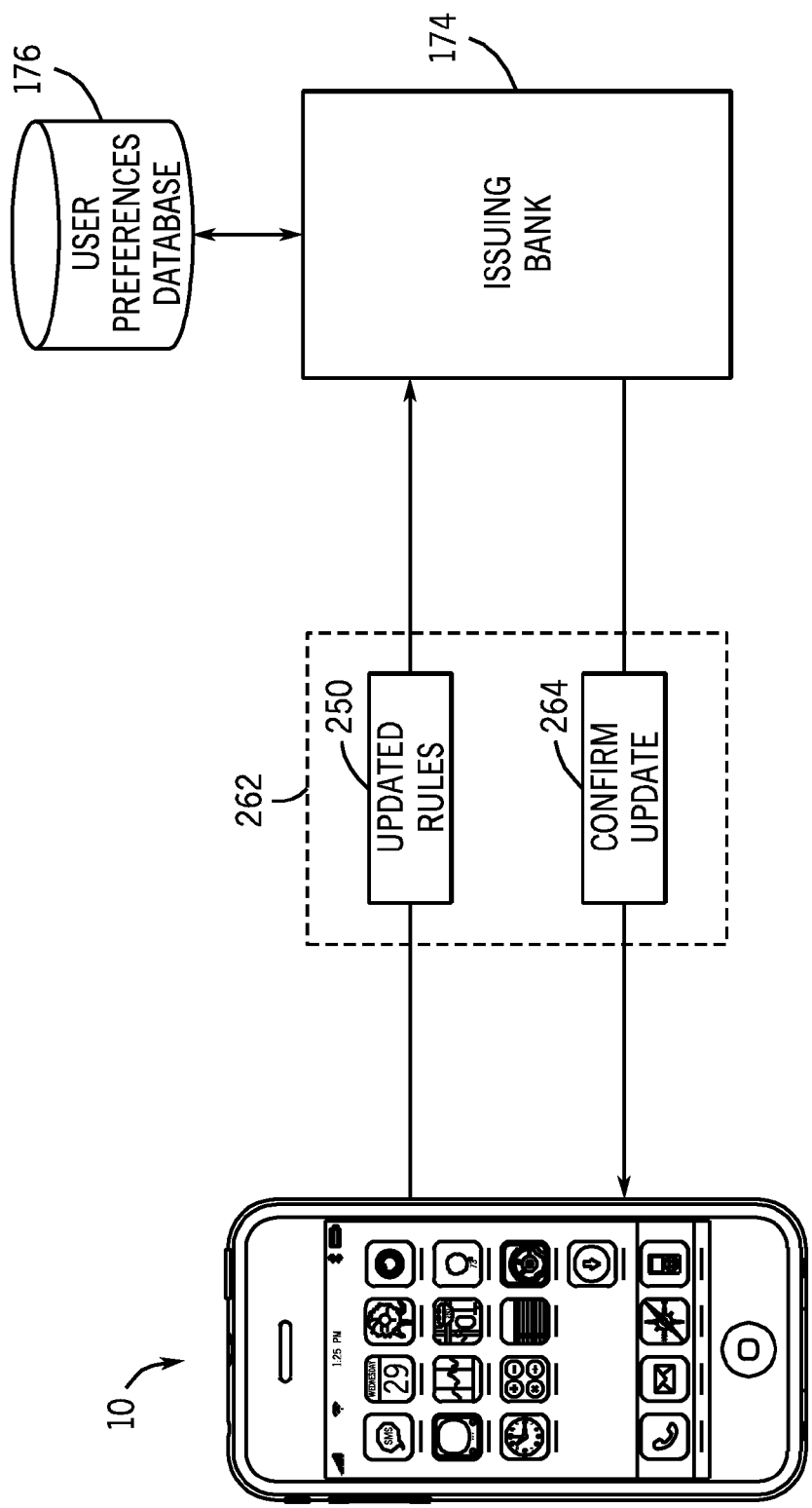
FIG. 8 is a block diagram illustrating how financial transaction rules for the subsidiary financial account may be updated in accordance with one embodiment.

Referring briefly to FIG. 8, a schematic representation depicting the process of updating user preferences to include the financial transaction rule defined in FIG. 7A is illustrated. The device 10 may establish a connection 262 with the issuing bank 174. The connection 262 may include any suitable network connection, such as a long-range connection provided by the communication device 60, as discussed above with reference to FIG. 2. For example, the network connection 262 may be a LAN connection, a WLAN connection, or a WAN connection provided by a 3G or EDGE cellular network. Once the connection 262 is established, the updated financial transaction rules 250 stored on the device 10 may be transmitted to the issuing bank 174. Upon receiving the updated rules 250, the issuing bank 174 may update the user preference database 176 to store the newly received rules pertaining to the subsidiary financial account 155. Once the user preferences database 176 has been updated, subsequent transactions made using the subsidiary account 155 may be evaluated against the per-transaction rule defined in FIG. 7A to determine whether the subsidiary transaction may be approved, whether authorization is required by the parent, or whether the transaction is to be declined. In one embodiment, once the user preferences database 176 has been updated, the issuing bank 174 may transmit a confirmation message 264 to the parent device 10 by way of the network 262. Additionally, it should be noted that while FIG. 8 shows the electronic device 10 communicating directly with the issuing bank 174, in alternate implementations, the electronic device 10 may transmit updated financial transaction rules directly to a card association (e.g. 172), such as where the subsidiary account is issued directly from a card association without first communication with an intermediary issuing bank (e.g. 174). Additionally, where a subsidiary account is associated with a merchant loyalty account, the updated rules may be transmitted directly to a server or a third party database that is associated with the particular merchant.

Still further, in a further embodiment, rather than transmitting the updated financial transaction rules 250 directly to the issuing bank 174 or the card association 172, the updating process may include first transmitting the financial transaction rules to a proxy server (not shown) operated by a third party entity. In one implementation, the third party entity may be the manufacturer of the device 10. As will be appreciated, the proxy server may provide additional security, manageability, and audit functions with regard to the presently illustrated system, and may further provide a common programming interface and communication channel to the device 10. Accordingly, once the updated financial transactions 250 are received by the proxy server, the proxy server may further establish channels of communication to communicate the updated rules 250 to the appropriate issuing bank and/or card association.

Referring back to FIG. 7B, the confirmation message 264 is illustrated by the pop-up window 256. For instance, once the user preferences database 176 has been successfully updated to include the financial transaction rules defined by the parent on the electronic device 10, the pop-up window 256 may be displayed on the device 10 and may include the notification message 268. The notification message 268 may inform the parent user that the rules for the subsidiary account 155 have been successfully updated. The parent user may then select the graphical button 270 to exit the pop-up window 256 and return to the screen 218. As shown in the final updated screen 218 of FIG. 7B, the transaction rule entered in FIG. 7A has been updated and the status indicator 252 and the graphical button 254 are no longer displayed.

Continuing now to FIGS. 9A-9D, various screens that may be displayed on the electronic device 10 depicting the configuration of additional financial transaction rules with respect to the subsidiary account 155 is illustrated. Referring first to the screen 208 in FIG. 9A, the status indicator 216 on the graphical button 214 may indicate that the financial transaction rules associated with the subsidiary account 155 are currently enabled. By selecting the graphical button 214, the parent user may access the screen 218 which may display a listing 220 of all currently enabled financial transaction rules, including the per-transaction amount rule specified in FIGS. 7A and 7B. By selecting the graphical button 222, the parent user may cause the pop-up window 228 to be displayed on the device 10. As discussed above, the pop-up window 228 may display a plurality of graphical buttons allowing the parent user to select a particular type of financial transaction rule to configure. In the present example, the parent user may select the graphical button 234 in order to define one or more financial transaction rules for the subsidiary account 155 based on either merchant categories or by specific merchants. Upon selecting the graphical button 234, the screen 272 may be displayed on the device 10. The screen 272 may display a listing 274 of restricted merchant categories as well as a listing 278 of restricted specific merchants selected by the parent with regard to the subsidiary account 155.

Figure 9A:
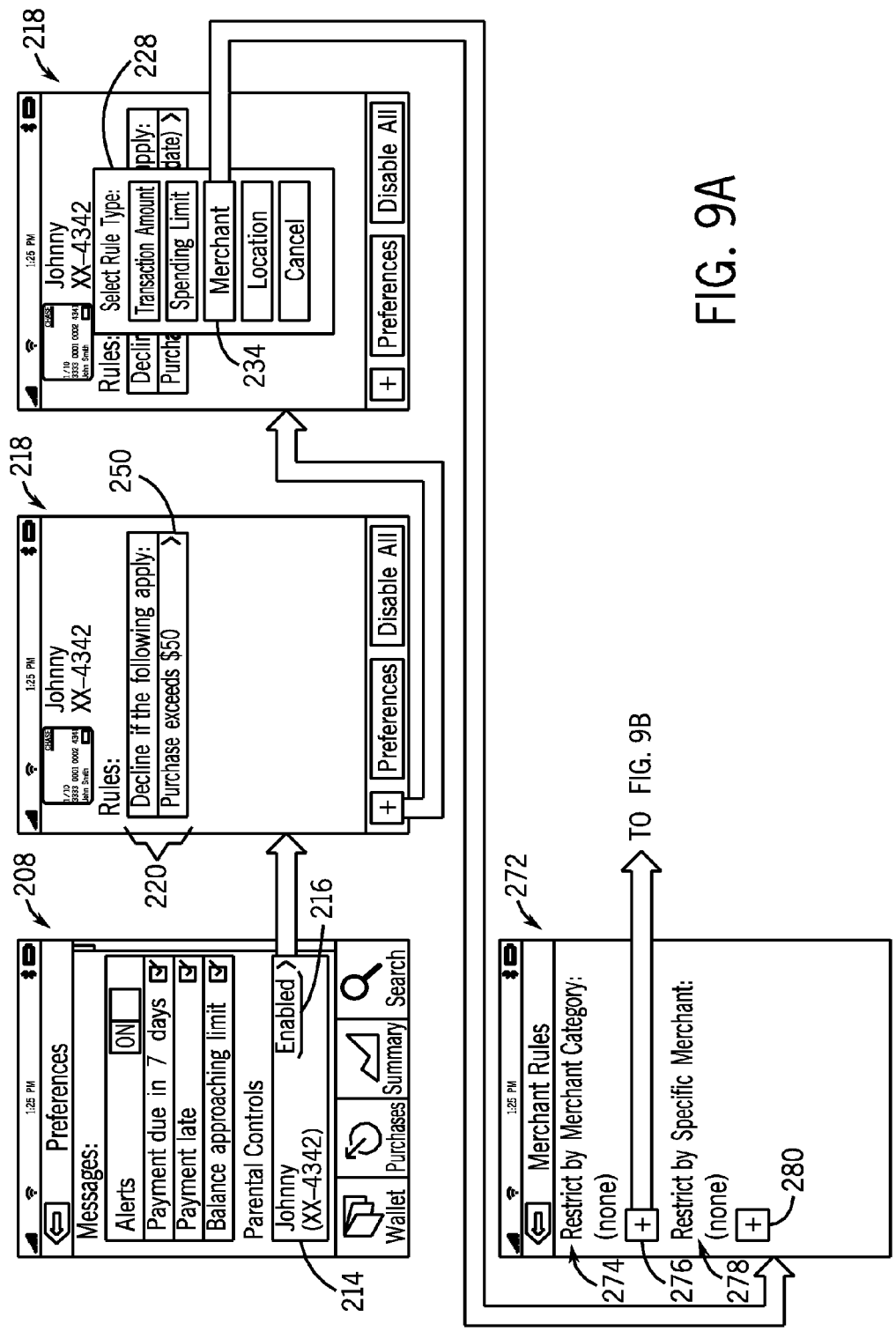
FIGS. 9A-9D show a plurality of screens that may be displayed on the device illustrating the configuration of additional financial transaction rules for the subsidiary financial account in accordance with one embodiment.
Figure 9B:
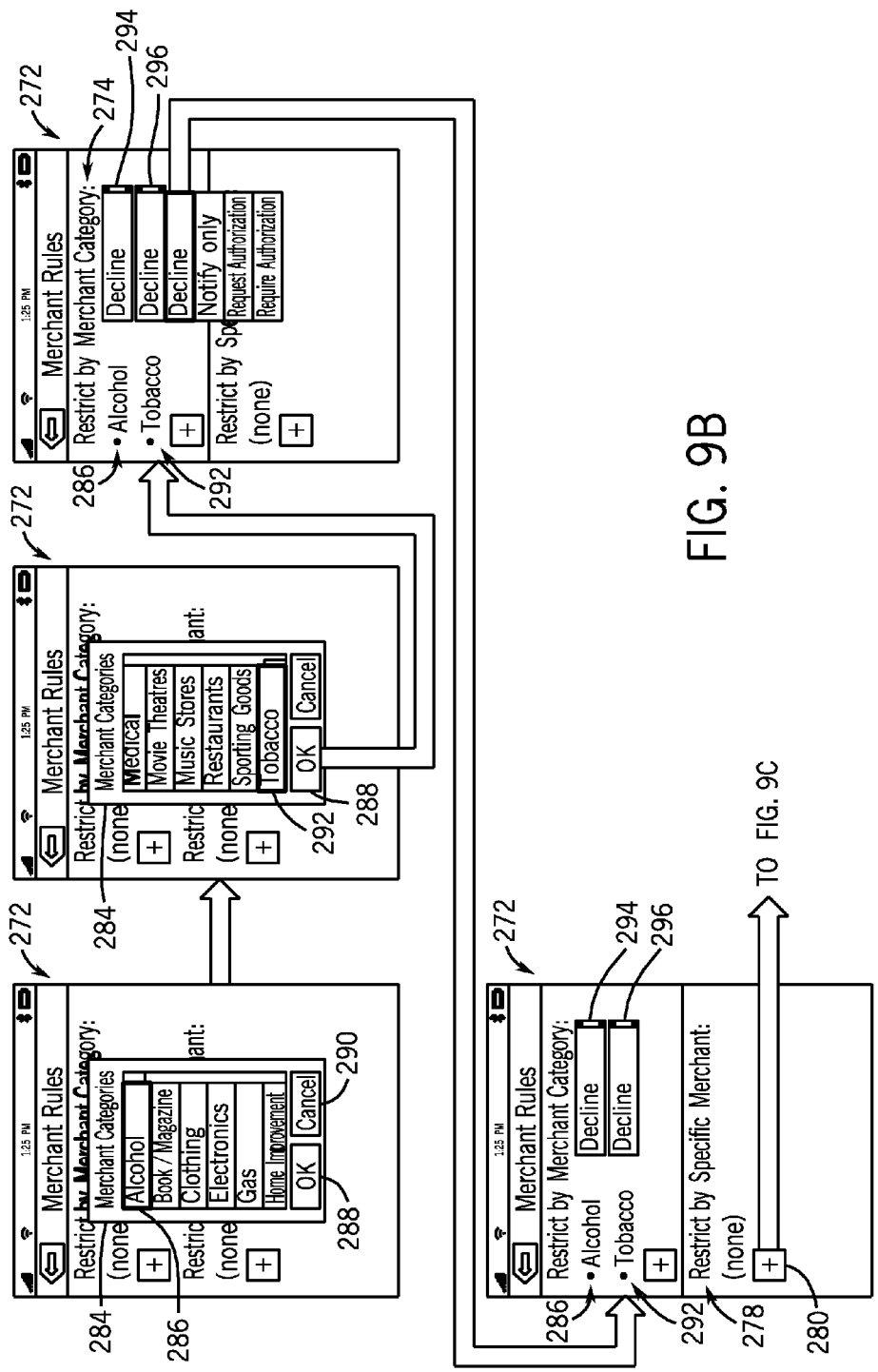

To select a particular merchant category or categories, the parent user may select the graphical button 276, which may cause the device 10 to display the pop-up window 284, as illustrated in FIG. 9B. The pop-up window 284 may display a listing of merchant categories. It should be understood that the merchant categories listed in the present figure are only meant to be exemplary and that in practice, a number of various merchant categories, such as those defined by merchant category codes (MCC) or standard industry codes (SIC), may be utilized and displayed in the pop-up window 284.

As shown on the current pop-up window 284, where the subsidiary account holder is a minor child, the parent may choose to select the merchant category 286 in order to restrict the subsidiary account 155 from being used to make purchases from merchants which sell alcoholic products. The parent may further choose to restrict the subsidiary account 155 from being used to make purchases from merchants that sell tobacco products, as shown by the selection of the merchant category 292. Thus, once the alcohol merchant's category 286 and the tobacco merchant category 292 have been selected, the parent may select the graphical button 288 to confirm the selection of merchant categories and to return to the screen and to close the pop-up window 284 and return to the screen 272. Alternatively, the parent may cancel the selection of merchant categories by selecting the graphical button 290.

As shown on the updated screen 272, the listing 274 of restricted merchant categories may include the merchant categories 286 and 292 selected from the pop-up window 284. Each of these restricted merchant categories may be associated with a drop down selection field which may provide for the selection of a particular control action to be performed if an attempt is made to use the subsidiary account 155 to purchase goods from a merchant classified within either the merchant category 286 or the merchant category 292. For example, the parent may specify in both of the drop down selection fields 294 and 296 that purchases from alcohol merchants 286 and tobacco merchants 292 merchants, respectively, are to be automatically declined.

As discussed above, the parent may further restrict the use of the subsidiary account 155 based on specific merchants. For example, by selecting the graphical button 280, the pop-up window 300 may be displayed on the screen 272 of the device 10. The pop-up window 300 may display a listing of specific merchants. In the present example, the parent user may select the merchants referred to by the reference numbers 302, 304, and 306. The pop-up window 300 may further display the graphical buttons 308 and 310. The parent may select the graphical button 310 to cancel the merchant selection process, or may select the graphical button 308 once all restricted merchants have been selected. Upon selection of the graphical button 308, the pop-up window 300 may be closed and the listing 278 of restricted specific merchants on the screen 272 may be updated to display the merchants 302, 304, and 306.

In the presently illustrated embodiment, the device 10 may allow the parent to select different control actions based on whether the subsidiary account is used to make a purchase online, such as through a website operated by a merchant, or whether the subsidiary account is used to make an in-person purchase, such as at a brick and mortar store location. For example, as shown on the screen 272 of FIG. 9C, the merchant 304, Apple Inc., and the merchant 306, Best Buy Co., Inc., may be recognized as merchants operating both an online store, as well as physical "brick and mortar" store locations. The parent may select a control action from the drop down selection fields 314 and 316 for online and in-person purchases, respectively, from the restricted merchant 304. In the present example, the parent may specify that both online and in-person purchases made from the merchant 304 require authorization from the parent. With regard to the merchant 306, the parent may specify in the drop down selection field 318 that authorization is required for online purchases made using the subsidiary account 155, but only require a notification (e.g. authorization not required, but parent is notified) if the purchase from the merchant 306 is made in-person, as indicated by the drop down selection field 320. Additionally, if a restricted merchant only conducts business online, such as the merchant 302, Amazon.com, then a single drop down selection field 312 for specifying a control action to be implemented with regard to online purchases made from the merchant 302 may be displayed. For instance, in the present example, the parent may select a control action that requires authorization for purchases made online from the merchant 302 using the subsidiary account 155.

In the presently illustrated embodiment, the financial account management application 34 may further provide the parent with the ability to specify different authorization times for online purchases and in-person purchases. For example, referring to the control actions defined for the merchant 304, when a purchase is made in person, it may be necessary to request and receive authorization from the parent in a relatively short amount of time, such that the time required in waiting for parental authorization does not unnecessarily delay the processing of sales by a cashier, thus preventing the disruption of the flow of customers which may be awaiting to check out. However, where the timing of the parental authorization is not as critical, such as for online purchases, and where the concern regarding customer wait times is less relevant, the parent may specify that a longer authorization time may elapse before the transaction is declined. Accordingly, the financial account management application may allow the parent to define authorization time settings 322 including an online purchase authorization time 324 and an in-person purchase authorization time 330.

In configuring the online purchase authorization time 324, the parent may enter a specified time value into the text field 326 and also select an appropriate time unit from the drop down selection field 328. In the present example, the online purchase authorization time 324 may be specified as two hours. Thus, where an online purchase made using the subsidiary account 155 requires authorization (e.g., such as purchases from the restricted merchants 304 and 306) and the authorization from the parent is not received within the two hour online authorization time, the transaction may be automatically declined by the issuing bank.

Additionally, the parent may specify an in-person purchase authorization time 330 by entering a time value in the text field 332 and by selecting an appropriate time unit from the drop down selection field 334. As explained above, due to the concern of disrupting customer flow in a physical store setting, the in-person purchase authorization time 330 is typically set to a relatively shorter authorization time compared to the online authorization time 324. In the present example, the in-person purchase authorization time 330 may be configured such that in-person purchases requiring parental authorization, such as in-person purchases made from the merchant 304, are automatically declined if the parental authorization is not received from the parent within 60 seconds. As will be appreciated, once the merchant restriction rules and the authorization times have been selected by the parent, these rules may be updated in the manner described above with reference to FIG. 7B.

In further implementations, the online (cardholder-not-present) authorization timer 324, instead rather than being configured by the device, may be defined by merchants (e.g., 168), merchant banks (e.g., 170), the issuing bank (e.g., 174), or the card association (e.g., 172). In further embodiments, the online authorization timer 324 may also be defined based on the dollar amount of a particular transaction.

Figure 9C:
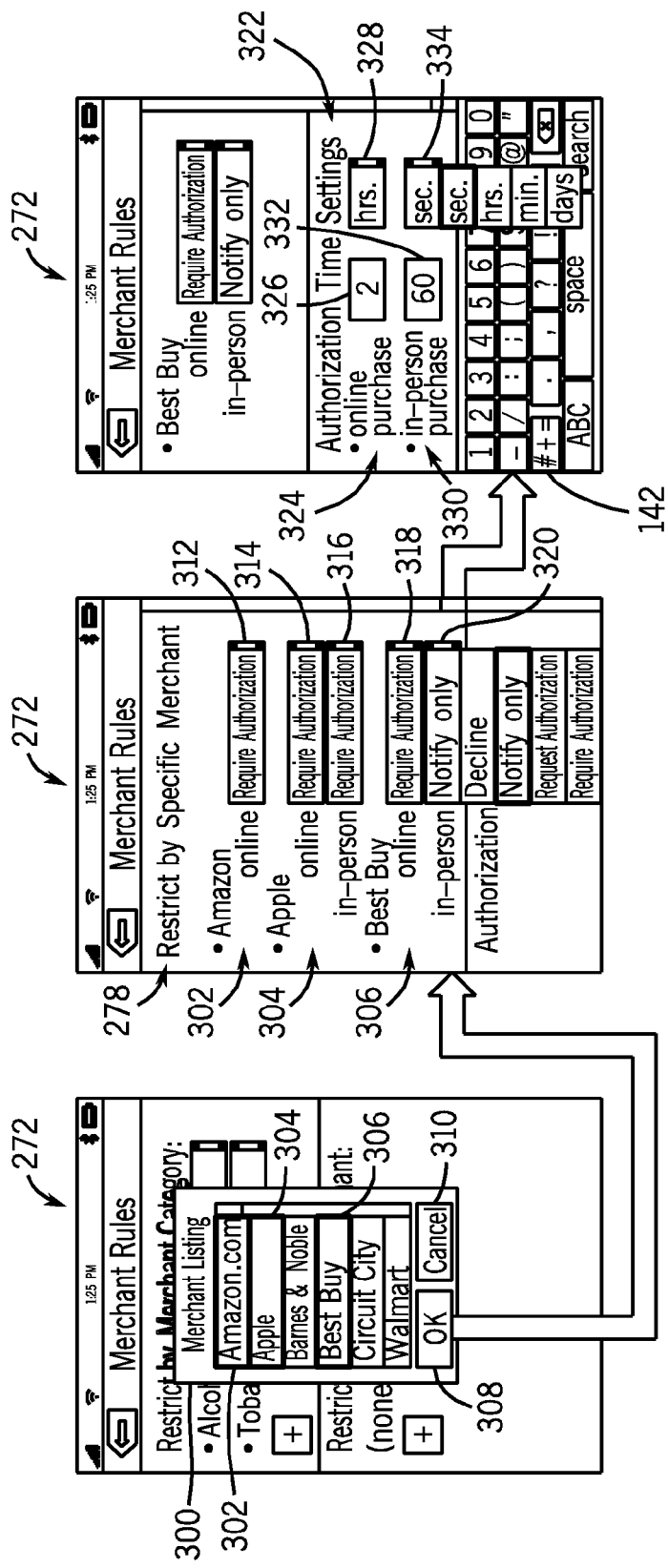
Figure 9D:
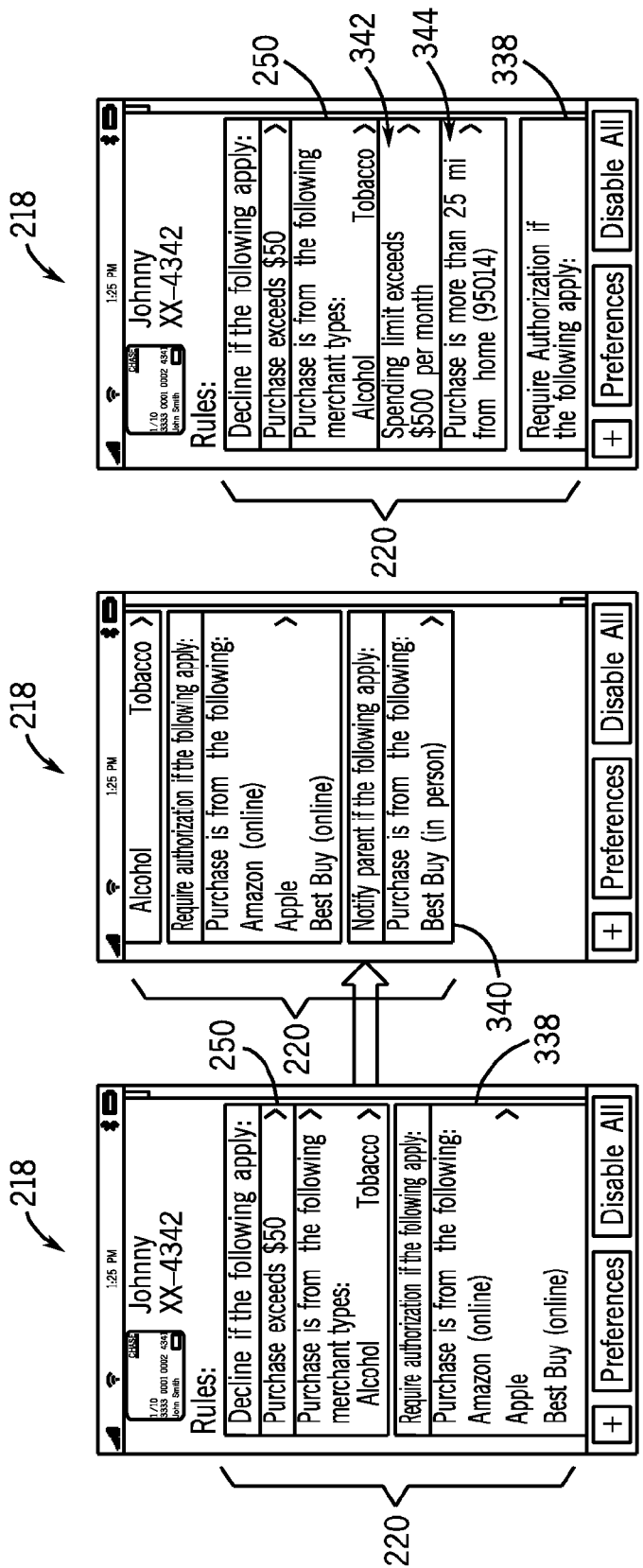

Continuing now to FIG. 9D, the screen 218 may be displayed on the device 10 showing the listing 220 of financial transaction rules, which may be updated based on the merchant restrictions defined in FIGS. 9A-9C. For example, the conditions 250 under which a transaction made using the subsidiary account 155 is automatically declined may be updated to include the restrictions based on the alcohol merchant category 284 and the tobacco merchant category 292, as discussed above. Additionally, the screen 218 of FIG. 9D may also display an updated set of conditions 338 under which authorization is required from a parent before a transaction made using the subsidiary account 155 may be approved. These conditions 338 may reflect the rules defined with regard to the specific merchants 302, 304 and 306, as described with reference to FIG. 9C. Specifically, the conditions 338 may indicate that online purchases from the merchant 302, online and in-person purchases from the merchant 304, and online purchases from the merchant 306 require the authorization from the parent user. As discussed above, depending on whether the purchase is attempted online or in-person, the corresponding online purchase authorization time 324 (e.g. 2 hours) and the in-person purchase authorization time 330 (e.g. 60 seconds) may be implemented, such that the transactions are automatically declined if parental authorization is not received within the designated authorization time. Finally, the updated screen 218 of FIG. 9D may also display a listing of conditions 340 specifying circumstances under which a notification is sent to the parent if the subsidiary account 155 is used to make a purchase from a particular merchant, such as by way of an electronic message sent from the issuing bank 174 to the device 10. By way of example, the conditions 340 under which the parent is notified may include purchases made in-person from the merchant 306, as defined by the parent in FIG. 9C. Further, in some implementations, the financial transaction rules may be configured such that more than one parent may authorize a transaction. For instance, in one scenario, a financial transaction rule may be defined such that either the mother or father of a child subsidiary account holder may authorize a particular transaction. Additionally, the financial transaction rules may also be configured such that multiple parents are required to authorize a subsidiary transaction. That is, certain transactions may require approval from both a mother and father of the child subsidiary account holder.

It should be understood that the configurations of the parental rules described herein are provided merely by way of example, and should not be interpreted as being limited in any manner. Indeed, depending on the specific rules that a parent or primary account holder deems necessary to apply to a particular subsidiary account, any combination of rules may be configured using the techniques discussed above. For example, as shown in the final screen of FIG. 9D, the parent may configure additional rules based on a spending limit per month 342, as well as establish restrictions based on geographic locations 344. As discussed above, theses rules may be configured by selecting the graphical buttons 232 and 236, respectively, from the pop-up window 228 discussed above in FIG. 7A. In the present example, the subsidiary account 155 may, based on the transaction rule 342, may be restricted to a total aggregate purchase amount of $500.00 per month. Additionally, the subsidiary account 155 may further be restricted from making purchases from locations that exceed a particular distance, such as 25 miles from a specified home location. As shown in the present example, the home location may be specified using zip code, although in alternate implementations, the home location may be specified by county, city, or state, as well as by latitude and longitude coordinates, and so forth.

Figure 10:
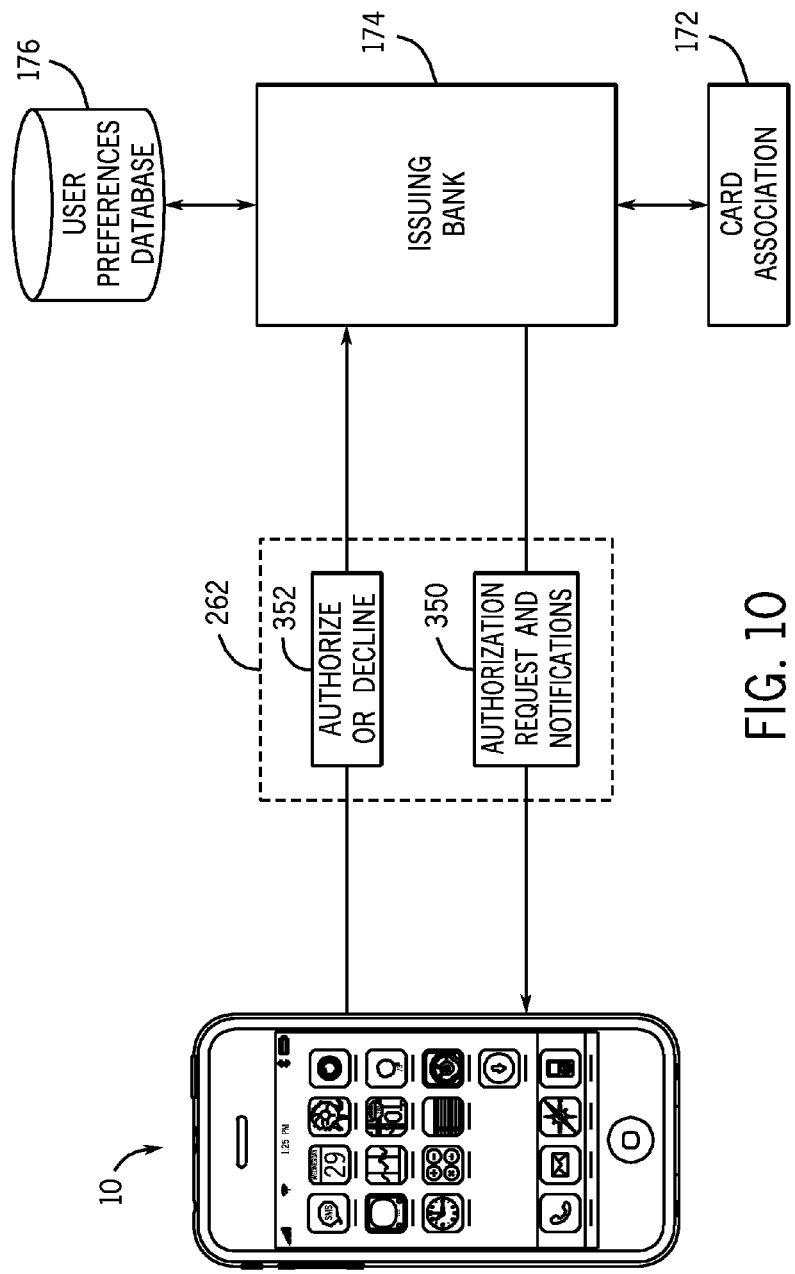
FIG. 10 is a block diagram illustrating how a transaction made using the subsidiary financial account may be authorized or declined in accordance with one embodiment.

Referring to FIG. 10, a schematic representation illustrating the transmission of authorization request and notification messages on the parent device 10 is illustrated. For example, based on the financial transaction rules defined in the previous figures which, as discussed above may be updated and stored in the user preferences database 176, each transaction attempted by the subsidiary account 155 may be received by the card association server 172, and transmitted to the issuing bank 174. The issuing bank 174 may then evaluate the subsidiary account transaction against the rules stored in the user preferences database 176 to determine whether the transaction may be approved or declined, or if the transaction requires sending a notification or an authorization request to the parent device 10. If, based on the financial transaction rules associated with the subsidiary account 155, the issuing bank 174 determines that a notification or an authorization request, represented here by the reference number 350, is to be sent to the parent device 10, the authorization request or notification 350 may be transmitted to the device 10 by way of the network 262, which as discussed above, may be provided by a LAN, WLAN, WAN, or any suitable network with which the parent device 10 is capable of establishing a connection. If the particular rule associated with a subsidiary account 155 requires parental authorization, an authorization request message may be displayed on the electronic device 10 prompting the parent to either authorize or decline the subsidiary transaction.

In response to the authorization request, the parent may transmit an indication to either authorize or decline the transaction, as represented by the reference number 352, to the issuing bank 174 by way of the network 262. As will be appreciated, depending on the response from the parent device 10, the issuing bank 174 may either authorize or decline the requested subsidiary account transaction. Additionally, as discussed above, if the parent fails to respond within the defined authorization times, such as the online purchase authorization time 324 and the in-person purchase authorization time 330, then the transaction requested by the subsidiary account 155 may be automatically declined. For instance, if no response is received, the issuing bank 174 may automatically decline the transaction. Alternatively, if the parent fails to provide a response within the allotted response time, then the device 10 may automatically transmit an instruction to the issuing bank 174 to approve or decline the transaction.

Figure 11A:
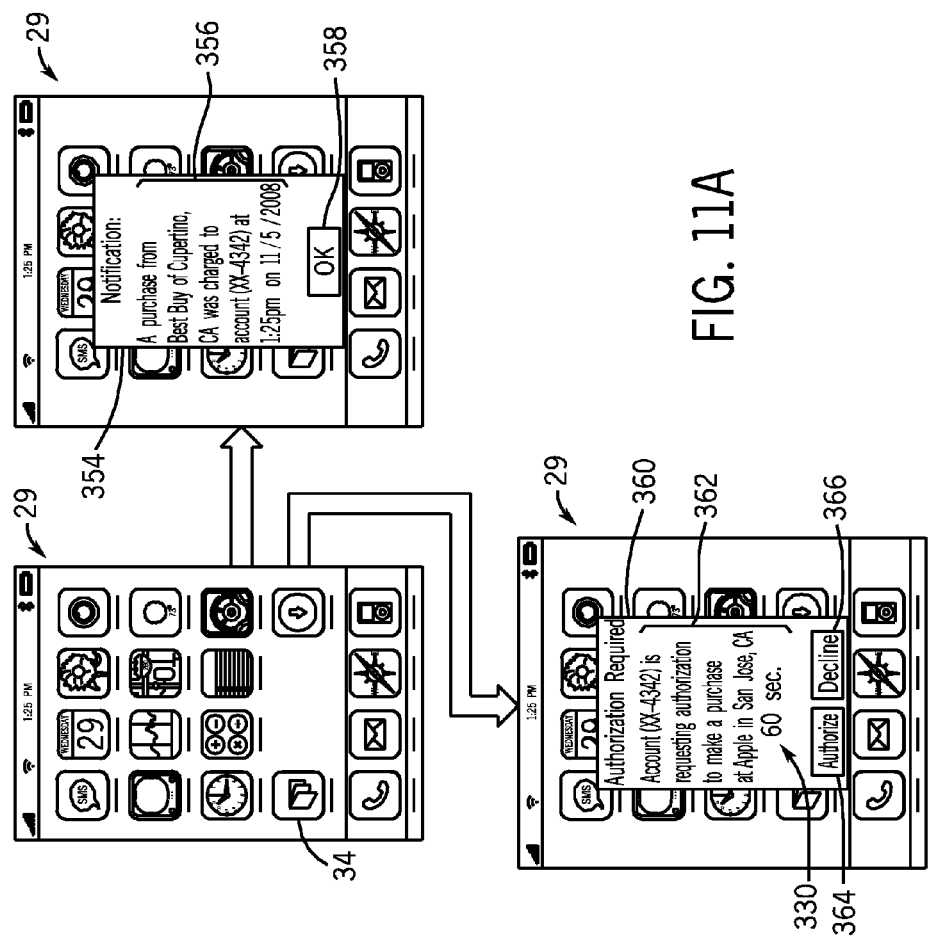
FIGS. 11A and 11B show a plurality of screens illustrating various authorization and notification messages that may be displayed on the device of FIG. 1 in accordance with one embodiment.
Figure 11B:
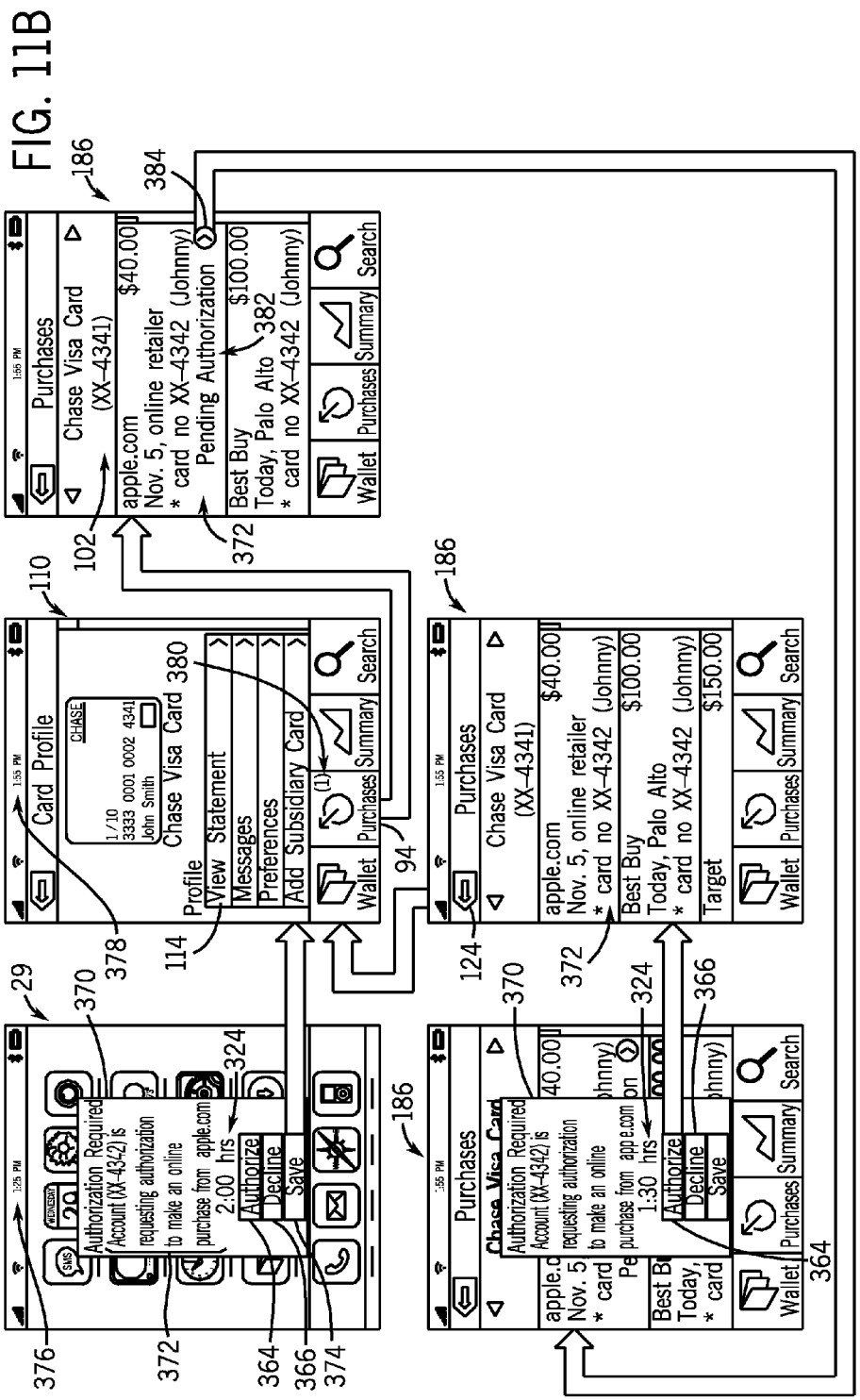

Continuing now to FIGS. 11A and 11B, screen images depicting notification and authorization request messages that may be received by the device 10 based upon the financial transaction rules defined in FIGS. 9A-9D are illustrated in accordance with one embodiment. Referring first to FIG. 11A, the device 10 may initially display the home screen 29. When a financial transaction rule is triggered, for example, such as when the subsidiary account holder attempts to make an in-person purchase from the merchant 306, a notification message may be sent to the device 10 from the issuing bank 174. In the present example, the notification may be displayed on the device 10 in the form of a pop-up notification window, referred to here by the reference number 354. The pop-up notification window 354 may display the notification message 356, which may inform the parent that the subsidiary account holder is attempting to make a purchase from the merchant 306. The message 356 may also include the location of the merchant's store as well as the time and date of the attempted transaction. Because the present transaction does not require authorization from the parent, the parent may acknowledge the notification message by selecting the graphical button 358 to return to the home screen 29 of the device 10.

In another example where the subsidiary account holder attempts to make an in-person purchase from the merchant 304, an authorization request message in accordance with the rules defined in FIG. 9C may be sent to the device 10 from the issuing bank 174. The authorization request message may be displayed as a pop-up window 360 containing the authorization request message 362. The message 362 may inform the parent that the subsidiary account 155 has been used to make an in-person purchase from the merchant 304 and that parental authorization is required in order to approve the transaction. The pop-up window 360 may display the graphical button 364, which the parent may select to authorize the transaction, and the graphical button 366 which the parent may select to decline the transaction. Additionally, the pop-up window 360 may display the in-person authorization purchase time 330, which may initiate a countdown once the authorization request is received on the device 10. As discussed above, if the parent fails to either authorize or decline the transaction within the allotted time 330, the device 10 may automatically transmit instructions instructing the issuing bank to decline or authorize the transaction, or the issuing bank may automatically decline the transaction in the absence of a response from the parent.

FIG. 11B illustrates an example in which authorization is required for an online purchase made using the subsidiary financial account 155. The authorization request message may appear in the form of the pop-up window 370 and may display the notification message 372 informing the parent that the subsidiary account 155 has been used to attempt an online purchase from the merchant 304 in accordance with the rules defined in FIG. 9C, as discussed above. In responding to the authorization request 370, the parent may select either the graphical button 364 to authorize the transaction or select the graphical button 366 to decline the transaction. Further, because the time allotted for the authorization of an online purchase may be greater relative to the authorization time for an in-person purchase, as indicated by the online purchase authorization time 324, the parent may also be provided the option, by way of the graphical button 374, to save the authorization request 370 for viewing at a later time. For example, in the present embodiment, the online purchase authorization request may be received at a first time referred to by the reference number 376. As will be illustrated in the subsequent screen images, the parent may access the saved authorization request 370 at a later time, referred to by the reference number 378 on the screen 110, in order to authorize or decline the online transaction attempted by the subsidiary account 155.

From the screen 110 in FIG. 11B, which may be accessed from the financial account management application 34, the graphical button 94 may display an indicator 380 informing the parent that there is an outstanding transaction requiring parental authorization. Upon selecting the graphical button 94, the parent may be navigated to the screen 186. As discussed above with reference to FIG. 5, the screen 186 may display a listing of all transactions charged to the primary account 102, including those made by subsidiary accounts linked to the primary account, such as the subsidiary account 155. As shown here, the pending online transaction authorization request from the merchant 304, referred to here by the reference number 372, may be displayed on the screen 186 as the most recent transaction. The pending transaction 372 may include a status indicator 382 to inform the parent that the transaction is still pending and awaiting a response to the previously received authorization request 370.

In order to retrieve the saved authorization request discussed above, the parent user may select the graphical button 384. Upon selection of the graphical button 384, the pop-up window 370 may be displayed once again on the screen 186. As shown here, the online authorization time 324 may be updated to reflect the remaining time in which the parent may either authorize or decline the present transaction before the transaction is automatically declined either by the issuing bank 174 or the device 10. For example, to authorize the online transaction from the merchant 304 upon viewing the saved authorization request at the time 378, the parent may select the graphical button 364. As discussed above, the selection of the graphical button 364 may provide an authorization message that is transmitted to the issuing bank 174, as discussed above. Once the issuing bank receives the authorization from the parent device 10, the issuing bank 174 may relay the authorization to the card association 172, thus approving the online transaction between the subsidiary account holder 164 and the merchant 304.

Once the graphical button 364 is selected, the pop-up window 370 may be closed, thus returning the user to the screen 186. As shown in the updated screen 186, the status indicator 382 previously indicating that the transaction 372 was awaiting a parental response to an authorization request is no longer displayed. Additionally, it should be understood that if the parent were to decline the transaction 372, such as by selecting the graphical button 366 instead of the graphical button 364, the transaction 372, in one embodiment, may be deleted or removed from the updated screen 186 displayed on the device 10.

Though not shown in the present figure, in a further embodiment the device 10 may further provide a parent with the ability to withdraw an authorization within a period of time after a transaction made by the subsidiary account holder has been authorized. For instance, based on this defined period of time, following the transmission of the authorization message (e.g., the selection of the graphical button 364), the parent may override this authorization and still decline the purchase. See, for example, Casey et al., U.S. patent application Ser. No. 12/351,687, entitled "Cardholder-Not-Present Authorization," filed on Jan. 9, 2009, the entirety of which is herein incorporated by reference for all purposes.

In one implementation, this function may be provided on the screen 186 using a graphical button (not shown) which, when selected, may transmit an instruction to the corresponding merchant for declining the previously authorized transaction. The period of time to withdraw the authorization ("withdraw authorization timer") may be defined in a number of ways. For instance, the withdraw authorization timer may be configured using the device 10 in a manner similar to the configuration of the in-person authorization timer 330 and online authorization timer 324, as discussed above. Further, the withdraw authorization timer may be established by a merchant, a merchant bank, and/or a card association, and may be based on a previous agreement between one or more of these entities. For example, if an merchant typically does not ship an item purchased online for a period of 4 hours, then the merchant may define the withdraw authorization time to be 4 hours or less. This ensures that purchases that have already been shipped have a low probability of being cancelled. As will be appreciated, the withdraw authorization timer may be defined depending on the merchants business objectives. For instance, if the merchant desires to move products and recognize revenue faster, then the withdraw authorization timer may be set to a relatively low value. Further, if the merchant has the ability to recall purchases in transit, then it may be tolerable to set the withdraw authorization timer to a relatively higher value (e.g., several days).

Figure 12:
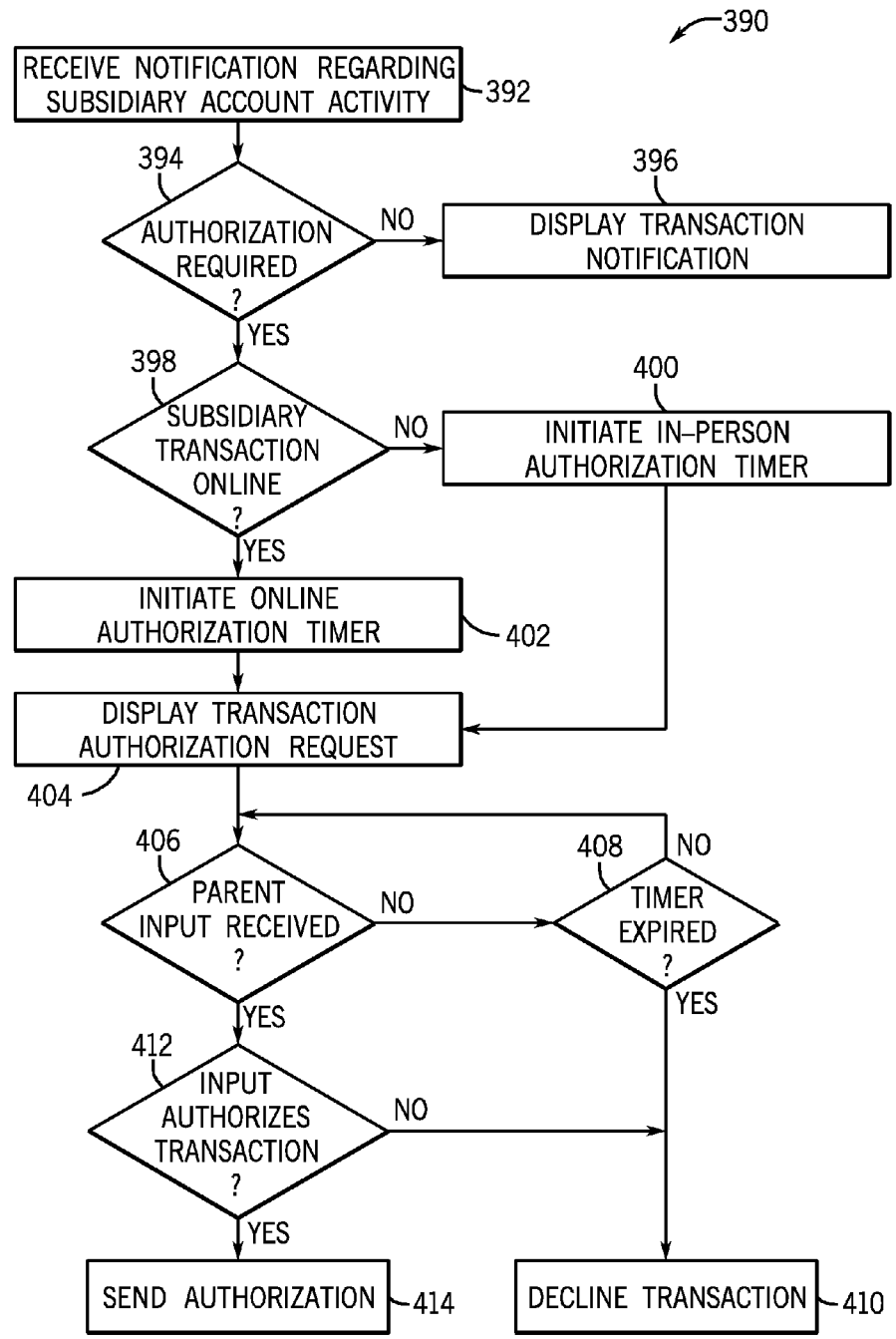
FIG. 12 is a flowchart depicting a method for authorizing or declining a subsidiary financial account transaction in accordance with one embodiment.

Continuing now to FIG. 12, a flowchart depicting a method for authorizing or declining a transaction initiated by a subsidiary account holder in accordance with one embodiment of the invention is illustrated and generally referred by the reference number 390. The method 390 begins at the step 392, in which a notification regarding a particular subsidiary account transaction may be received on the parent device 10. For example, based on the rules discussed above in FIGS. 9A-9D, certain transactions from particular merchants may require that the parent is notified and, additionally, certain transactions may further require that the parent is not only notified, but that the parent provide a response authorizing a particular transaction. By way of example, a notification may be of the type illustrated by the pop-up window 354 in FIG. 11A. Similarly, an authorization request may be of the type represented by the pop-up window 360 in FIG. 11A if the transaction is made in-person with regard to a particular merchant, or of the type illustrated in FIG. 11B by the pop-up window 370, wherein the transaction is an online purchase.

At decision step 394, a determination is made as to whether parental authorization is required for a particular transaction. For example, this determination may be evaluated based on the financial transaction rules defined by a parent. If at decision step 394, it is determined that authorization is not required, then a notification message (e.g., not requiring authorization) may be displayed on the device 10, as depicted by step 396. If at step 394, it is determined that parental authorization is required to approve the transaction, the method 390 may proceed to the decision block 398, in which a determination may be made as to whether the transaction is online or in-person. If the transaction is not an online transaction, then an authorization timer corresponding to an in-person authorization time may be initiated at step 400. As shown in FIG. 9C by way of example, an in-person purchase authorization time 330 may be set to provide a 60 second window for receiving a response from the parent. Returning to step 398, if it is determined that the requested transaction is an online purchase, the online authorization time may be initiated as shown in step 402. As discussed above in the example shown in FIG. 9C, an online authorization time 324 may be set by the parent to provide a period of 2 hours for responding to an authorization request. Thus, depending on whether the online authorization time 324 or the in-person authorization time 330 is selected, an authorization request message may be displayed on the device 10 at step 402. For instance, if the transaction is an online transaction requiring parental authorization, step 402 may correspond to the display of the pop-up window 370 on the device 10. If the transaction is an in-person transaction requiring parental authorization, the step 402 may correspond to the display of the pop-up window 360 on the device 10.

Next, at decision block 406, a determination may be made as to whether an input has been received on the device 10 in response to the authorization request. For example, as discussed above with reference to FIG. 11A, the parent, in response to the authorization request at step 404, may choose to either authorize or decline the present transaction. If no response is received from the parent, the process 390 may continue to step 408 whereby a determination may be made as to whether the authorization time, which may be the in-person timer (e.g., step 400) or the online timer (e.g., step 402) depending on the particular transaction, has expired. If the timer has not expired at step 408, the method 390 may continue to wait for an input from the parent, thus returning to decision step 406. Alternatively, if the timer has expired at step 408, then the device 10 may automatically send an instruction to the issuing bank to decline the transaction, as shown here by the step 410. Additionally, in one embodiment the device 10 may send no response to the issuing bank, and the issuing bank may automatically decline the transaction if no response is received within the defined parental authorization response times.

Returning to the decision step 406, if a response to the authorization request from step 404 is received, the method may continue to decision step 412, in which a determination may be made as to whether the response from the parent corresponded to a selection to authorize or to decline the present transaction. If the received input indicates that the parent chose to decline the transaction, then the method may proceed to step 410, as discussed above, in which an instruction to decline the transaction may be transmitted to the issuing bank 174. Alternatively, if the response from the parent indicates that the transaction may be authorized, then an instruction to authorize the transaction may be transmitted to the issuing bank, which may then relay the authorization to additional servers, such as a card association server (e.g., 172), eventually providing a downstream authorization to a merchant indicating that the transaction between the subsidiary account holder and the merchant is approved.

Figure 13A:
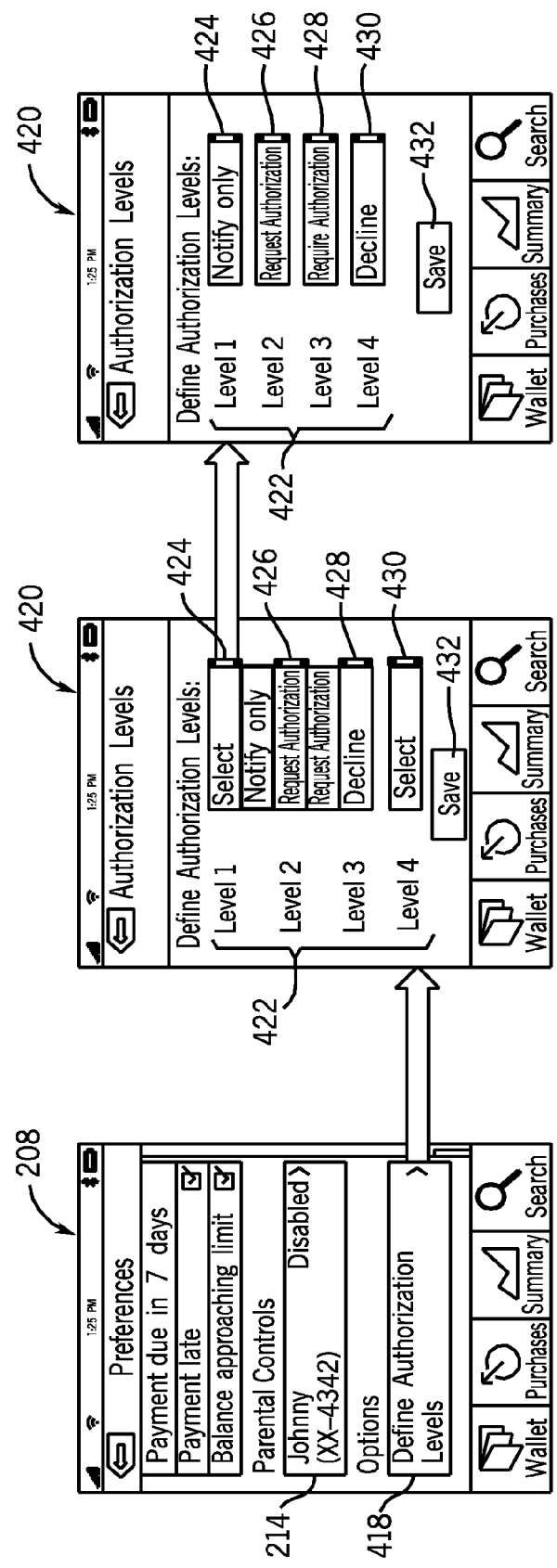
FIG. 13 shows a plurality of screens that may be displayed on the device of FIG. 1 illustrating a technique for defining a financial transaction rule including multiple levels of control in accordance with one embodiment.
Figure 13B:
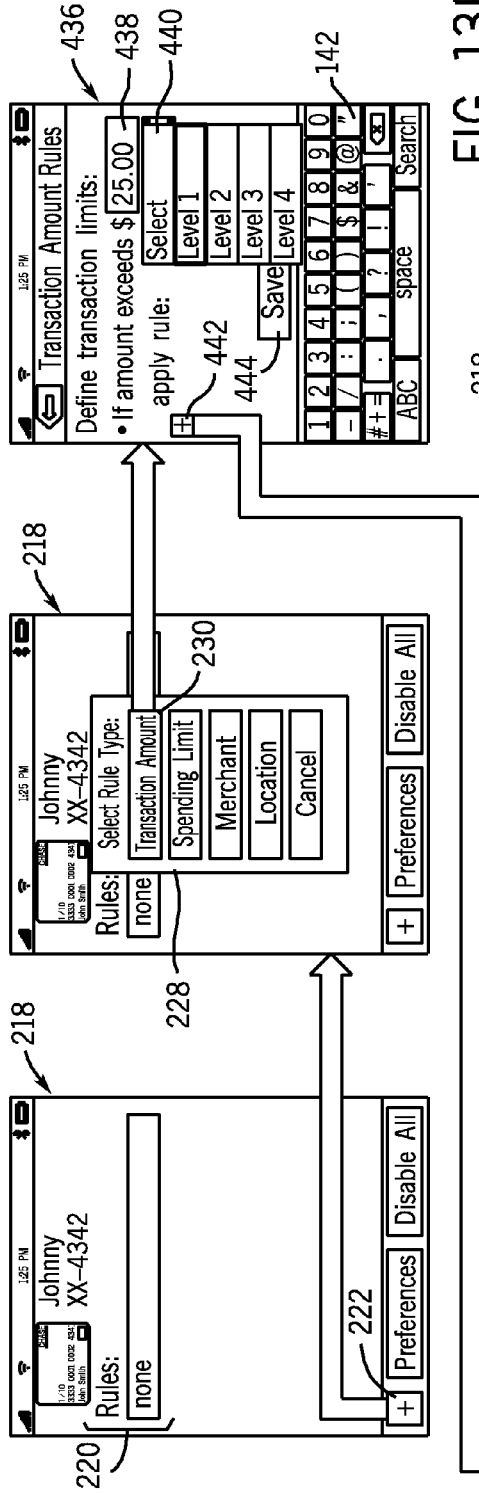
Figure 13B:
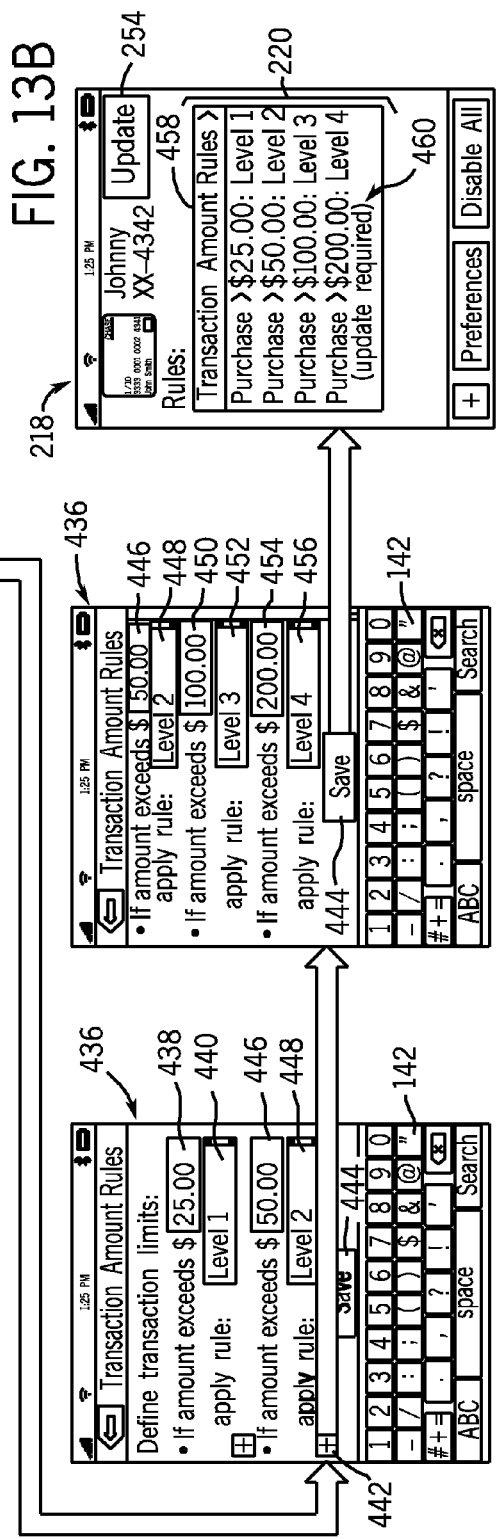

FIGS. 13A and 13B illustrate a further embodiment in which a parent may define multiple levels of control to be applied to a particular financial transaction rule. For instance, the parent may be able to further customize the financial transaction rules discussed above based on multiple tiers of authorization. In one embodiment, the screen 208 previously discussed with reference to FIG. 7A may further include an option for defining multiple authorization levels, shown here by the graphical button 418. Upon selecting the graphical button 418, the parent user may be advanced to the screen 420. The screen 420 may provide for the configuration of multiple levels of authorization, generally referred to here by the reference number 422.

In the present example, financial account management application 34 on the device 10 may allow the parent to define four different levels of authorization by way of the drop down selection fields 424, 426, 428, and 430. For instance, each of the drop down selection fields shown in the screen 420 may allow the parent to select from the four control actions discussed above, including: (1) a control action to notify the parent, but without require or requesting authorization; (2) a control action for requesting authorization from the parent, but not requiring the authorization; (3) a control action that requests and requires parental authorization; and (4) a control action under which a transaction is automatically declined. It should be appreciated that the four control actions corresponding to the four authorization levels shown in FIG. 13A are merely intended to provide an example of the tiered authorization schemes provided by the presently disclosed techniques. Accordingly, the specific examples shown here should not be construed as being limited in this regard.

As illustrated in FIG. 13A, the parent may specify a first level of authorization that requires a notification to be sent to the parent device 10, as shown in the drop down selection field 424. The parent may further define a second level of authorization in which an authorization request is sent to the parent, though express parental authorization may not be required. For instance, the authorization times discussed above with regard to online and in-person transactions may apply to this level of control, but if no response is received from the parent within the allotted time, an instruction indicating that the transaction may be approved may be sent from the device 10 the issuing bank. The parent may further define a third level of authorization, as indicated by the drop down selection field 428. This level of authorization differs from the second level of authorization (e.g., drop down field 426) in that an authorization is required for a particular transaction such that the transaction is automatically declined if the required authorization is not received from the parent within the allotted response time. Finally, the parent may define a fourth level of control, as indicated by the drop down selection field 430, in which a particular transaction to which the fourth level of control is applicable is automatically declined by the issuing bank. Once the various authorization levels have been defined the parent may confirm the selections by using the graphical button 432, thus saving the configuration of the multiple authorization levels 422 onto the device 10.

Referring now to FIG. 13B, a series of screens is illustrated showing how the multiple levels of authorization defined in FIG. 13A may be used by the parent to construct a financial transaction rule. For the purposes of the present example, the screen 218, previously described above with reference to FIG. 7A, is shown as having no rules currently associated with the subsidiary financial account 155. By selecting the graphical button 222, the pop-up window 228 may be displayed, offering various types of financial transaction rules that may be selected by the parent. As shown here, the parent may select the graphical button 230 in order to establish a financial transaction rule based on a per-transaction amount for charges and purchases made using the subsidiary financial account 155. Upon selecting the graphical button 230, the device 10 may display the screen 436. The screen 436 may initially display a single text field 438 in which the parent may specify, by way of the numerical keyboard interface 142, a first per-transaction amount limit. The screen 436 may also initially display a single drop down selection field 440 by which the parent may select one of the authorization levels defined in FIG. 13A to be applied to the limit specified in the text field 438. As shown in the present example, the parent may select the first level of authorization to be applied to an amount of $25.00 or more. Thus, based on this rule, if a transaction made using the subsidiary financial account 155 exceeds $25.00, a notification may be transmitted to the parent device 10.

The parent may continue to define additional tiers of per-transaction amount limits by selecting the graphical button 442. For instance, the selection of the graphical button 442 may cause the screen 436 to be updated and to display an additional text field 446 and an additional drop down selection field 448. Using these additional fields, the parent may specify a second transaction amount limit and further specify a second control action to be applied as a second tier of the present per-transaction amount rule. For example, the parent may enter the value of $50.00 into the text field 446 and select the second authorization level from the drop down selection field 448. Thus, if a transaction made using the subsidiary financial account exceeds $50.00, an authorization request may be transmitted to the parent, although an authorization is not required to approve a transaction. As discussed above, under the second level of authorization, the parent may, within the allotted authorization response time, choose either to authorize or decline the transaction. However, if the parent does not respond within the allotted time, then an instruction may be sent to the issuing bank 174 indicating that the transaction may be approved.

The parent may continue to add additional tiers of per-transaction limits under the current rule by selecting the graphical button 442 again. For instance, the parent may define two additional tiers of authorization, including a third tier in which an amount exceeding $100.00, as shown in the text field 450, is associated with the third authorization level of control, as indicated by the drop down selection field 452. Thus, purchases made using the subsidiary financial account 155 may not be approved without authorization from the parent if the transaction amount exceeds $100.00. Additionally, the parent may further specify a fourth tier amount in the text field 452, which may be associated with the fourth level of authorization. In the present example, the fourth tier may specify that transactions made using the subsidiary financial account 155 which exceed an amount of $200.00 are automatically declined. Once the multiple tiers of the financial transaction rule have been selected, the parent may save the present configuration to the device 10 by selecting the graphical button 444. Thereafter, the device 10 may return to an updated screen 218.

In the updated screen 218, the listing 220 of financial transaction rules may display a summary of the multiple tiers of transaction amount limits specified by the parent in the previous screen 436 and referred to here by the reference number 458. As discussed above, before these rules are applied to the subsidiary financial account 155, the rules may need to be updated with the issuing bank 174, such as in accordance with the process described above with regard to FIG. 8. For example, the transaction amount rules 458 displayed on the screen 218 may include the indicator 460 informing the parent that an update must be performed before the rules take effect. As discussed above, the update may be performed by selecting the graphical button 254 by which the updated rules are transmitted to an issuing bank 174 by way of a network, such as the network 262. Thus, once these rules have been received by the issuing bank 174 and stored in the user preferences database 176, the various levels of authorization defined by these rules may be applied to transactions made using the subsidiary account 155.

It should be understood that the multiple levels of authorization shown herein may additionally be applied to the other types of financial transaction rules discussed above. For example, with regard to financial transaction rules based on location, the parent may define a first distance from a particular area, such as a home zip code, by which a first level of authorization (e.g., Level 1—requiring notification) is applied. The parent may further define a second distance which may be farther from the home location compared to the first distance, and which may be associated with a second level authorization (e.g., Level 2—request parental authorization). The parent may continue to define geographic rules for the third and fourth levels of authorization discussed above. Indeed, it should be understood that the multiple levels of authorization described herein may be applied to one or a combination of the financial transaction rules discussed above and may ultimately depend on the amount of control the parent wishes to exert over the subsidiary financial account 155.

As mentioned above, while the embodiments shown above have been discussed with respect to the handheld device shown in FIG. 1, additional embodiments of the present techniques may be implemented via an application that may be executed and run on a desktop computer or a workstation. Continuing now to FIGS. 14A and 14B, screen images depicting an application that may be displayed on a computer workstation is illustrated. The screen 470 may represent a media player application, such as iTunes®, available from Apple Inc., and may provide for the establishment of financial transaction rules in accordance with the techniques discussed above. The media player application may include a navigation bar 472 which may display shortcuts or links to access various digital content libraries 474, such as music, movie, television shows, podcast, radio, as well as ring tone libraries. Additionally, where the computer workstation includes network connectivity, the navigation bar 472 may include shortcuts for connecting to various online stores, such as an online digital media provider or an online software provider, generally referred to by the reference number 476. The navigation bar 472 may further include shortcuts to a financial management application 478 that may be implemented as part of the media player application. For instance, to access the financial management application, the user may select the shortcut 478, which may cause the screen 470 to display various selection tabs 480 that may be associated with the financial management application 478. As a default setting, the selection tab 482 may be initially selected upon execution of the application 478. The selection tab 482 may display a listing 484 of financial accounts stored on the computer workstation. For instance the listing 484 may include the accounts 102, 106, and 108 discussed above. Each of the accounts may indicate a current balance, such as a credit card balance 104, bank account balance, or a prepaid account balance. The screen 470 may also display the graphical button 486 which may be displayed next to each of the listed accounts. The user may select the corresponding graphical button 486 for a particular account in order to view a statement summary. By way of example, a statement summary may generally appear in the form and contain the information listed on the screen 152 in FIG. 3.

Figure 14A:
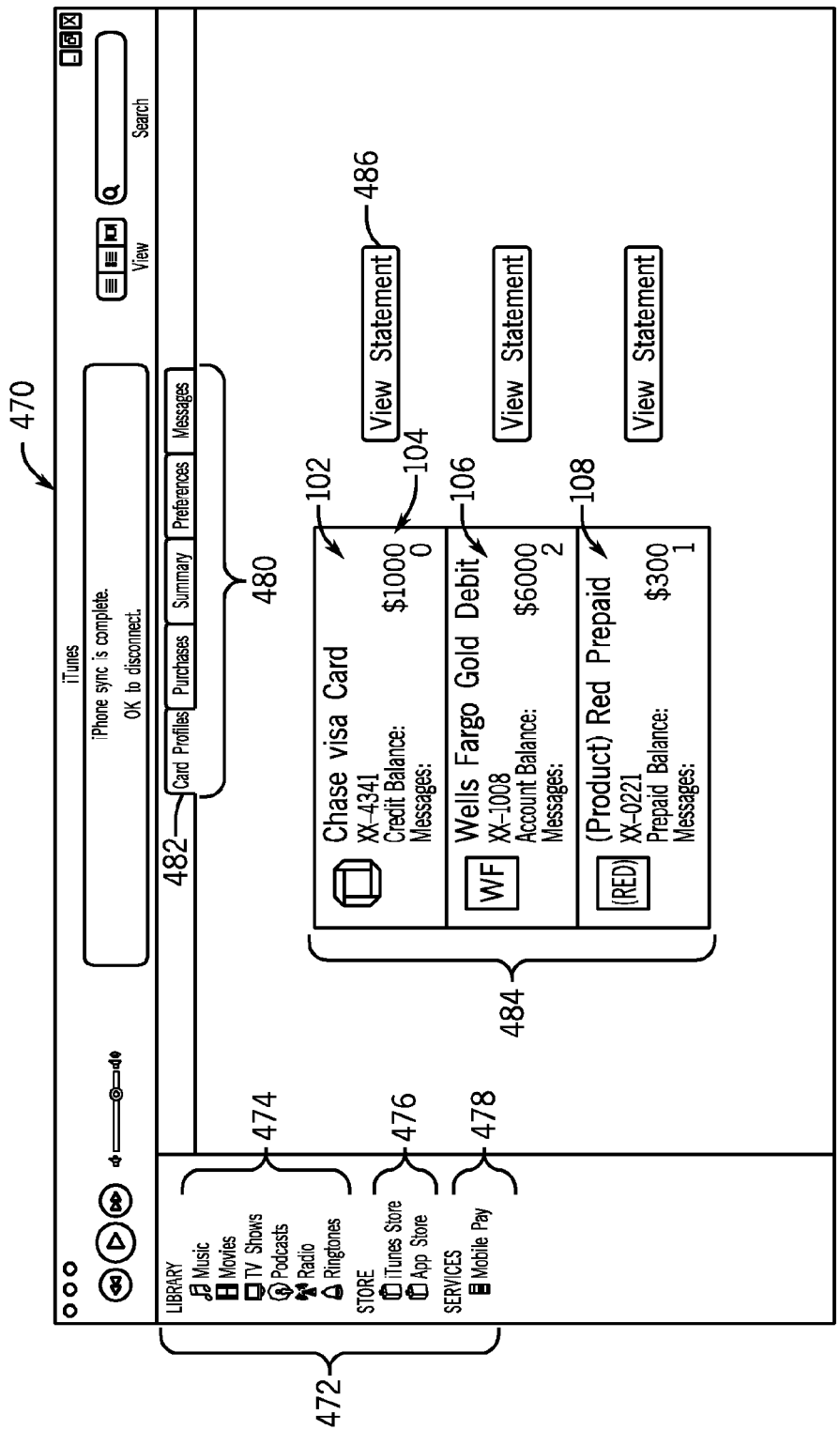
FIGS. 14A and 14B show screens that may be displayed on a computer or workstation for configuring financial transaction rules for a subsidiary financial account.
Figure 14B:
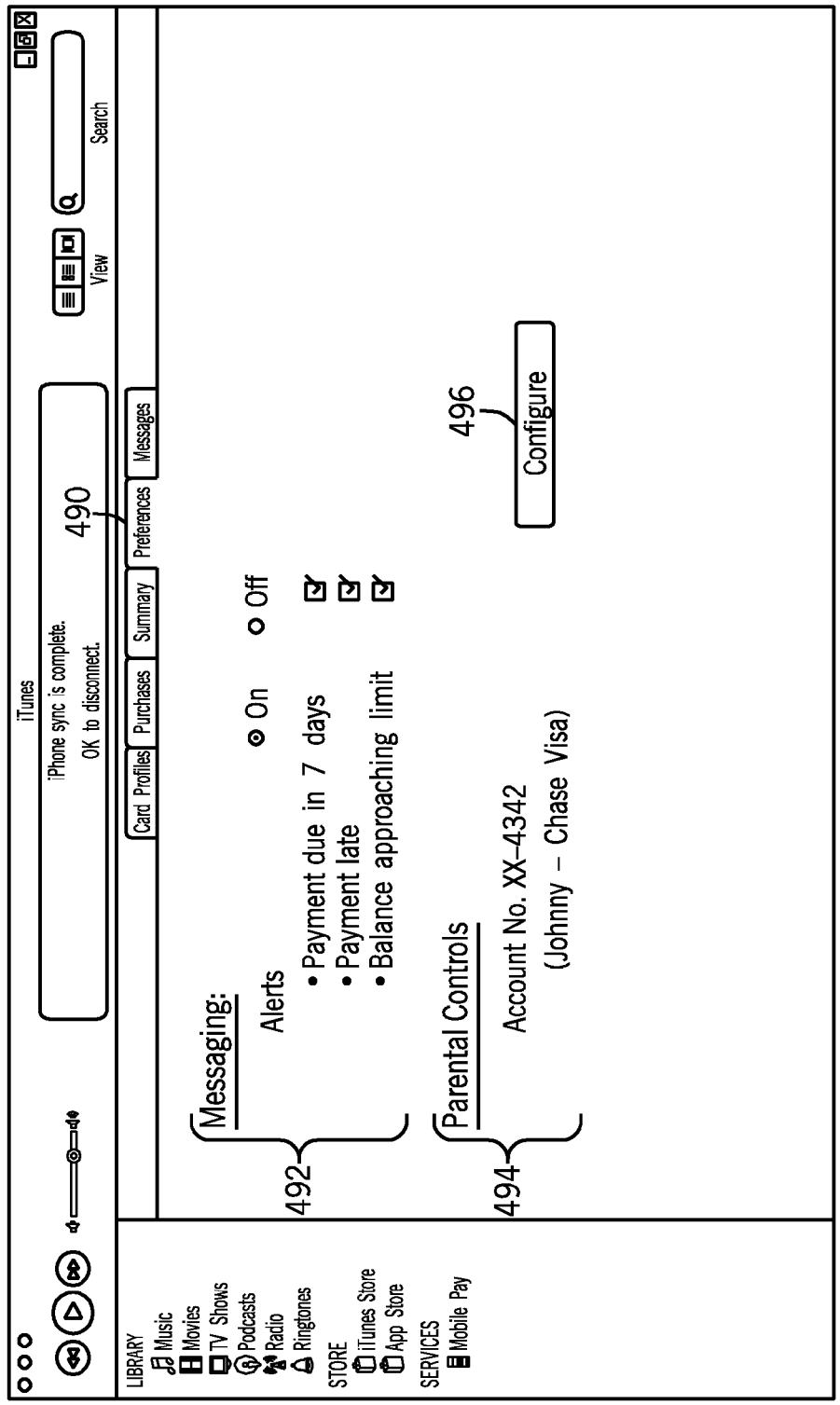

Continuing to FIG. 14B, a user may navigate away from the selection tab 482 by selecting an alternate tab, such as the selection tab 490. In the present example, the selection tab 490 is generally associated with the configuration of various preferences associated with the financial accounts managed by the application 478. For example, the selection tab 490 may provide for the configuration of various messaging options generally referred to here by the reference 492. These messaging options 492 may be similar to those depicted in the screen 208 in FIG. 7A. Additionally, the selection tab 490 may further provide for the configuration of financial transaction rules to be applied to subsidiary accounts, such as the subsidiary account 155. As will be appreciated, the techniques for configuring various financial transaction rules may generally be similar to the techniques described in the above figures and may be initiated by selecting the graphical button 496. For example, the financial transaction rules may be based upon transaction limits, including a per-transaction amount and a periodic spending amount, as well as by merchant categories or specific merchants, as well as by geographic location.

In one embodiment, the media player application shown in FIGS. 14A and 14B may include a synchronization feature configured to provide for the synchronization of the device 10 of FIG. 1 with the computer workstation when the device 10 is connected, such that data is mutually updated between the computer workstation executing the media player application and the device 10. For instance, if a parent user has defined financial transaction rules on the device 10 that need to be updated with a corresponding financial server, the process of updating financial transaction rules in the present embodiment may include receiving the financial transaction rules on the computer workstation as part of a synchronization process, and transmitting the updated financial rules from the computer workstation to an appropriate financial server, as discussed above. In other words, the update process generally discussed above in FIG. 7B may be performed using the computer workstation instead of the handheld device 10.

As shown in the presently illustrated figures, the various functionalities discussed herein may be provided by way of the financial account management application (e.g., represented by the icon 34) stored on a device 10 incorporating one or more aspects of the present disclosure. As will be appreciated, the financial account management application may include encoded instructions stored on one or more machine readable media, such as the storage device 54, and configured to be executed by the processor 50 to provide for one or more of the functionalities of the device 10 discussed above. Additionally, it should be understood that the financial account management application may also include encoded instructions defining the various graphical screen images and user interface functions discussed throughout the present disclosure. However, it should also be understood that the functionalities set forth and described in the above figures may be achieved using a wide variety graphical elements and visual schemes, and that the present disclosure is not intended to be limited to the precise user interface conventions depicted above.

While the present invention may be susceptible to various modifications and alternative forms, specific embodiments have been shown by way of example in the drawings and will be described in detail herein. However, it should be understood that the techniques set forth in the present disclosure are not intended to be limited to the particular forms disclosed. Rather, the invention is to cover all modifications, equivalents and alternatives falling within the spirit and scope of the disclosure as defined by the following appended claims.

What is claimed is:

1. A method, comprising:
defining one or more rules using a handheld electronic device, wherein the one or more rules establish restrictions on transactions made using a financial account associated with an account holder other than the user of the handheld electronic device; and
applying the one or more rules to the financial account;
defining one or more authorization response times using the handheld electronic device, wherein the one or more authorization response times define respective periods of time in which the handheld electronic device may send a response to a transaction authorization request; wherein the transaction is either automatically approved or automatically declined if no response is sent from the handheld electronic device within a period of time corresponding to one of the one or more authorization response times, wherein the one or more authorization response times includes a first authorization response time and a second authorization response time, wherein the handheld electronic device is allotted the first authorization response time for responding to the transaction authorization request if the transaction is an in-person transaction and the second authorization response time for responding to the transaction authorization request if the transaction is an online transaction.

2. The method of claim 1, wherein the handheld electronic device is operated by an account holder of a primary account with which the financial account is linked.

3. The method of claim 1, wherein applying the one or more rules to the account comprises communicating the one or more rules to an external server controlled by a financial entity associated with the financial account, wherein the financial entity updates user preference settings associated with the financial account based upon the communicated rules.

4. The method of claim 3, wherein communicating the one or more rules to an external server comprises first communicating the one or more rules to a proxy server controlled by an third party entity other than the financial entity, wherein the proxy server is configured to provide at least one of security measures, manageability measures, and auditing measures, or any combination thereof, and wherein the proxy server is configured to communicate the one or more rules to the external server controlled by the financial entity associated with the financial account.

5. The method of claim 4, wherein the proxy server is configured to provide a programming interface that is compatible with a programming interface on the handheld electronic device.

6. The method of claim 1, wherein the restrictions established by the one or more rules are based upon a single transaction amount, an aggregate transaction amount over a period of time, a merchant category, a specific merchant, or a geographic region, or any combination thereof.

7. The method of claim 1, wherein each of the one or more defined rules is associated with a corresponding control action, wherein the control action is applied in response to a transaction initiated using the financial account, and wherein the control action comprises at least one of sending a notification to the handheld electronic device, sending a transaction authorization request to the handheld electronic device, or declining the transaction.

8. The method of claim 1, wherein the first authorization response time is less than the second authorization response time.

9. The method of claim 1, wherein if the handheld electronic device authorizes the online transaction within the second authorization response time, the handheld electronic device is configured to, within a defined period of time following the authorization of the online transaction, transmit an instruction to decline the transaction to at least one of an issuing bank, a card association, a merchant, or a merchant bank, or any combination thereof.

10. The method of claim 9, wherein the defined period of time is established by one of the user of the handheld electronic device, the issuing bank, the card association, the merchant, or the merchant bank, or any combination thereof.

11. A device, comprising:
one or more input structures;
a storage structure encoding routines for a financial account management application, wherein the encoded routines comprise:
a routine for receiving a first set of one or more inputs via the input structures, wherein the first set of received inputs define one or more rules for establishing restrictions on transactions initiated by a subsidiary financial account associated with an account holder other than a user of the device; and
a routine for storing the one or more defined rules;
a routine for receiving a second set of one or more inputs via the input structures, wherein the second set of received inputs define a first authorization response time and a second authorization response time for authorization of transactions, wherein the device is allotted the first authorization response time for responding to an in-person transaction authorization request and allotted the second authorization response time for responding to an online transaction authorization request; and
a processor configured to execute the encoded routines.

12. The device of claim 11, wherein the encoded routines further comprise a routine for transmitting the one or more rules to an external server controlled by a financial entity associated with the subsidiary financial account, wherein the financial entity updates user preference settings associated with the subsidiary financial account based upon the transmitted rules.

13. The device of claim 12, comprising a network device configured to establish a network connection with the external server for transmitting the one or more rules.

14. The device of claim 13, wherein the network device is configured to provide for a local area network (LAN), a wireless local area network (WLAN), or a wide area network (WAN), or any combination thereof in transmitting the one or more rules to the external server.

15. The device of claim 12, wherein the routine for transmitting the one or more rules is executed by the processor in response to a request from the user of the device to update the user preference settings associated with the subsidiary account.

16. The device of claim 11, comprising a display, wherein the routine for receiving the one or more inputs defining the one or more rules defines a graphical user interface, and wherein the execution of the routine for receiving the one or more inputs by the processor causes the graphical user interface to be displayed on the display.

17. The device of claim 11, wherein the first authorization response time is less than the second authorization response time.

18. The device of claim 11, wherein the encoded routines comprise a routine for receiving a third set of inputs via the input structures, wherein, if the device authorizes an online transaction within the second response authorization time, the third set of inputs overrides the authorization of the online transaction and declines the online transaction if the third set of inputs is received within a defined period of time following the authorization of the online transaction.

19. A method, comprising:
defining a multiple-tier transaction rule having a plurality of transaction limits using a handheld electronic device;
associating each of a plurality of control actions with a respective one of the plurality of limits, wherein defining the multiple-tier transaction rule and associating each of the plurality of control actions with a respective one of the plurality of transaction limits comprises defining a first transaction limit and associating the first transaction limit with a first control action, defining a second transaction limit and associating the second transaction limit with a second control action, defining a third transaction limit and associating the third transaction limit with a third control action, and defining a fourth transaction limit and associating the fourth transaction limit with a fourth control action, wherein the first, second, third, and fourth transaction limits are different from one another; and applying the multiple-tier transaction rule to a subsidiary financial account associated with an account holder other than the user of the handheld electronic device;

wherein the first control action comprises receiving a notification message on the handheld electronic device if the first transaction limit of the multiple-tier transaction rule is violated by a transaction initiated using the subsidiary account;

wherein the second control action comprises receiving a first type of authorization request message on the handheld electronic device for authorization of the transaction initiated using the subsidiary account if the second transaction limit of the multiple-tier transaction rule is violated by the transaction, wherein the transaction is approved if the handheld electronic device does not respond to the first type of authorization request message within a defined period of time, wherein the defined period of time for responding to either the first or second type of authorization request message is selected from a first period of time and a second period of time, wherein the first period of time is selected if the transaction is an in-person transaction, and wherein the second period of time is selected if the transaction is an online transaction;

wherein the third control action comprises receiving an second type of authorization request message on the handheld electronic device for authorization of the transaction initiated using the subsidiary account if the third transaction limit of the multiple-tier transaction rule is violated by the transaction, wherein the transaction is declined if the handheld device does not respond to the second type of authorization request message within the defined period of time; and wherein the fourth control action comprises declining the transaction initiated using the subsidiary account without an authorization request message being received by the handheld electronic device if the fourth transaction limit of the multiple-tier transaction rule is violated by the transaction.

20. The method of claim 19, wherein applying the multiple-tier transaction rule to the subsidiary account comprises communicating the multiple-tier transaction rule to an external server controlled by a financial entity associated with the subsidiary financial account, wherein the financial entity updates user preference settings associated with the subsidiary financial account based upon the communicated rules.

21. The method of claim 20, wherein the financial entity comprises one of an issuing bank, a credit card association, or a merchant loyalty account entity.

22. The method of claim 19, wherein the first, second, third, and fourth transaction limits are defined as either individual transaction amounts or aggregate transaction amounts over a period of time.

23. The method of claim 19, wherein the second transaction limit is greater than the first transaction limit, wherein the third transaction limit is greater than the second transaction limit, and wherein the fourth transaction limit is greater than the third transaction limit.

* * * * *